United States Patent
Kim et al.

(10) Patent No.: US 10,788,990 B2
(45) Date of Patent: Sep. 29, 2020

(54) VEHICLE WITH IMPROVED I/O LATENCY OF ADAS SYSTEM FEATURES OPERATING ON AN OS HYPERVISOR

(71) Applicant: TOYOTA JIDOSHA KABUSHIKI KAISHA, Toyota-shi, Aichi-ken (JP)

(72) Inventors: BaekGyu Kim, Mountain View, CA (US); Chung-Wei Lin, Mountain View, CA (US); Shinichi Shiraishi, Mountain View, CA (US)

( * ) Notice: Subject to any disclaimer, the term of this patent is extended or adjusted under 35 U.S.C. 154(b) by 227 days.

(21) Appl. No.: 15/434,396

(22) Filed: Feb. 16, 2017

(65) Prior Publication Data

US 2018/0232156 A1 Aug. 16, 2018

(51) Int. Cl.
*G06F 3/06* (2006.01)
*G06F 13/16* (2006.01)

(52) U.S. Cl.
CPC .......... *G06F 3/0611* (2013.01); *G06F 3/0659* (2013.01); *G06F 3/0685* (2013.01); *G06F 13/161* (2013.01); *G06F 13/1642* (2013.01)

(58) Field of Classification Search
CPC .... G06F 3/0611; G06F 3/0659; G06F 3/0685; G06F 13/161; G06F 13/1642
See application file for complete search history.

(56) References Cited

U.S. PATENT DOCUMENTS

| | | | | |
|---|---|---|---|---|
| 9,405,688 | B2* | 8/2016 | Nagarajan | G06F 12/0815 |
| 9,725,089 | B2* | 8/2017 | Tashiro | B60K 31/00 |
| 2011/0202918 | A1* | 8/2011 | Park | G06F 9/45541 718/1 |
| 2014/0258620 | A1* | 9/2014 | Nagarajan | G06F 12/0815 711/120 |
| 2016/0082961 | A1* | 3/2016 | Tashiro | B60K 31/00 701/93 |

* cited by examiner

*Primary Examiner* — Jerrah Edwards
(74) *Attorney, Agent, or Firm* — Burbage Law, P.C.; Jon-Michael Burbage; Elizabeth Ruzich

(57) ABSTRACT

The disclosure includes embodiments for improving a performance of a set of Advanced Driver Assistance Systems ("ADAS systems") included in a vehicle by decreasing a latency for processing a set of input/output ("I/O") requests generated by one or more active ADAS systems from the set of ADAS systems. A method includes determining situation data describing a driving situation for the vehicle. The method includes identifying the one or more active ADAS systems from the set of ADAS systems for the driving situation. The method includes determining whether an input/output ("I/O") communication conflict exists for the one or more active ADAS systems. The method includes applying at least one of a direct I/O strategy and a virtual I/O strategy to the set of I/O requests based on whether the I/O communication conflict exists.

20 Claims, 10 Drawing Sheets

| VEHICLE FEATURE | RELATED SENSOR FROM SENSOR SET | CRITERIA RELEVANT TO THE VEHICLE FEATURE | THRESHOLDS FOR TRIGGERING THE PROVISION OF THE VEHICLE FEATURE |
|---|---|---|---|
| Pre-Collision System, "PCS" (example ADAS system) | • Camera<br>• Millimeter wave radar<br>• Speed sensor | • Range, "R," from the ego vehicle to a detected object on the roadway which is an obstacle for the ego vehicle<br>• Relative speed, "RS," of the ego vehicle and the obstacle | • R: 50 meters<br>• RS: 50 miles per hour |
| Adaptive Cruise Control, "ACC," system (example ADAS system) | • Camera<br>• Millimeter wave radar<br>• Speed sensor | • Range, "R," from the ego vehicle to a detected object on the roadway which is an obstacle for the ego vehicle<br>• Relative speed, "RS," of the ego vehicle and the obstacle | • R: 200 meters<br>• RS: 50 miles per hour |
| Lane Keep Assist, "LKA," system (example ADAS system) | • Camera<br>• Millimeter wave radar<br>• Speed sensor<br>• Steering angle sensor | • A percentage of the vehicle which is crossing the border that separates two lanes | • 20% |
| Movie streaming system (example infotainment system) | The communication unit monitors a rate at which movie data is downloaded, and in this way, acts as a sensor | • An average rate for downloading movie data (current or expected) | • 1 Megabyte per second |

VEHICLE WITH IMPROVED I/O LATENCY OF ADAS SYSTEM FEATURES OPERATING ON AN OS HYPERVISOR

BACKGROUND

The specification relates to a vehicle with improved input/output ("I/O") latency of Advanced Driver Assistance System ("ADAS system" if singular, "ADAS systems" if plural) features operating on an operating system ("OS" if singular, "OSes" if plural) hypervisor.

Vehicle control systems are becoming increasingly popular. One example of a vehicle control system is an ADAS system.

ADAS systems provide one or more autonomous features to the vehicles which include these ADAS systems. For example, an ADAS system may monitor the position of a vehicle relative to the lane in which the vehicle is traveling, and if the vehicle begins to swerve outside of that lane the ADAS system may take remedial action by repositioning the vehicle so that the vehicle stays in the lane or providing a notification to a driver of the vehicle so that the driver knows that they need to take action to remedy the situation.

SUMMARY

An OS hypervisor beneficially enables multiple guest operating systems to be executed by a single electronic control unit ("ECU" is single, "ECUs" if plural) of a vehicle. The OS hypervisor typically collects I/O requests from multiple guest operating systems in one place and then processes them in the order they are received. However, our experimentation shows that this method of managing I/O requests for OS hypervisors frequently results in significant bottlenecking (and associated time delays) of processing the I/O requests (e.g., releasing the I/O requests to whichever I/O device they are addressed to).

No vehicle manufacturer has ever used OS hypervisors to implement ADAS features. This is because the bottlenecking described above, and the delay it causes, would likely result in catastrophic events resulting in loss of life. The latency system described herein solves this problem by eliminating bottlenecking for OS hypervisors Some vehicles have "a set of ADAS systems" that provide a sufficient combination and quality of ADAS features that these vehicles are considered to be "autonomous vehicles." The set of ADAS systems includes one or more ADAS systems that provide one or more autonomous features for a vehicle.

The latency system described herein includes codes and routines which, when executed by an onboard vehicle computer (e.g., an ECU), causes the onboard vehicle computer to identify, analyze and manage I/O requests for an OS hypervisor which is implemented in a vehicle to achieve ADAS functionality for the vehicle, and possibly other types of vehicle functionality. For example, the vehicle functionality can include: (1) ADAS functionality provided by the set of ADAS systems of the vehicle; or (2) infotainment functionality provided by an infotainment system of the vehicle. ADAS functionality includes any functionality provided by one or more ADAS systems of the vehicle. Infotainment functionality includes any functionality provided by one or more infotainment systems of the vehicle.

An ADAS system generates and transmits one or more I/O requests in order to communicate with one or more I/O devices of the vehicle through the OS hypervisor and thereby provide its ADAS functionality. Similarly, an infotainment system generates and transmits one or more I/O requests in order to communicate with one or more I/O devices of the vehicle through the OS hypervisor and thereby provide its infotainment functionality. Multiple vehicle systems (i.e., ADAS systems, infotainment systems, etc.) may attempt to route an I/O request to the same I/O device at the same time, resulting in an I/O communication conflict.

In some embodiments, the latency system selects one of two different routing strategies for managing the I/O requests for the OS hypervisor. These two strategies are described below as "virtual I/O" and "direct I/O."

In some embodiments, as a first ADAS system of a vehicle executes (a "first execution"), it generates one or more I/O requests that are addressed to one or more I/O devices (e.g., sensors or actuators of the vehicle). A second ADAS system (or an infotainment system of the vehicle) may be executing contemporaneous to the execution of the first ADAS system (a "second execution"). This second execution may produce one or more I/O requests that are addressed to one or more I/O devices that are the same as those addressed by the first execution, thereby creating an I/O communication conflict. The latency system 199 solves this problem.

For example, the latency system 199 described herein includes codes and routines which, when executed by an onboard vehicle computer, causes the onboard vehicle computer to execute one or more of the following steps: (1) determine whether one or more I/O requests generated by the second execution creates an I/O communication conflict with the first execution; (2) if no I/O communication conflict is present, directly routing the I/O requests to the I/O devices which they address (see, e.g., FIG. 4B which depicts an example of direct I/O according to some embodiments); and (3) if an I/O communication conflict is present, (i) assign an urgency value for individual I/O requests of the first execution and the second execution based on whether the vehicle feature these I/O requests are associated with providing is associated with safety, (ii) place the conflicted I/O requests in a hypervisor I/O queue of the OS hypervisor; and (iii) process the I/O request in the hypervisor I/O queue based on the relative urgency values for the queued I/O requests (see, e.g., FIG. 4A which depicts an example of virtual I/O according to some embodiments).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method executed by a processor of a vehicle for improving a performance of a set of ADAS systems included in the vehicle by decreasing a latency for processing a set of I/O requests generated by one or more active ADAS systems from the set of ADAS systems, the method including: determining situation data describing a driving situation for the vehicle; identifying the one or more active ADAS systems from the set of ADAS systems for the driving situation based on the situation data and rule data that describes which ADAS systems from the set of ADAS systems are active for a plurality of driving situations; determining whether an I/O communication conflict exists for the one or more active ADAS systems based on the rule data that describes which I/O devices are called by the set of I/O requests transmitted by the one or more active ADAS systems; and applying at least one of a direct I/O strategy and a virtual I/O strategy to the set of I/O requests based on whether the I/O communication conflict exists, where the direct I/O strategy is applied by the processor if the I/O communication conflict does not exist and the virtual I/O strategy is applied by the processor if the I/O communication conflict does exist. Other embodiments of this aspect include corresponding computer systems, apparatus, and computer programs recorded on one or more computer storage devices, each configured to perform the actions of the methods.

Implementations may include one or more of the following features. The method where the set of ADAS systems are provided by a single hardware ECU. The method where the set of ADAS systems are provided by a single hardware ECU that executes an OS hypervisor which, when executed by the processor, generates a plurality of virtual ECUs which each provide a different ADAS system from the set of ADAS systems. The method where each virtual ECU from the plurality of ECUs includes a different OS such that the plurality of ECUs include heterogeneous OSes. The method where the virtual I/O strategy is applied and the method further includes: assigning an urgency value to each of the one or more active ADAS systems based on a relative urgency of the one or more active ADAS systems based on the driving situation, where each individual I/O request of the set of I/O requests is assigned the urgency value which was assigned to the active ADAS system which generated each individual I/O request; storing the set of I/O requests in a hypervisor I/O queue; and processing individual I/O requests of the set of I/O requests out of the hypervisor I/O queue based on the urgency values assigned to each of the individual I/O requests of the set of I/O requests such that I/O requests. The method where the vehicle is an autonomous vehicle. The method where the vehicle is a highly autonomous vehicle ("HAV"). Implementations of the described techniques may include hardware, a method or process, or computer software on a computer-accessible medium.

One general aspect includes a system for improving a performance of a set of ADAS systems included in a vehicle by decreasing a latency for processing a set of I/O requests generated by one or more active ADAS systems from the set of ADAS systems, the system including: a processor; and a non-transitory memory storing computer code which is operable, when executed by the processor, to cause the processor to perform steps including: determining situation data describing a driving situation for the vehicle; identifying the one or more active ADAS systems from the set of ADAS systems for the driving situation based on the situation data and rule data that describes which ADAS systems from the set of ADAS systems are active for a plurality of driving situations; determining whether an I/O communication conflict exists for the one or more active ADAS systems based on the rule data that describes which I/O devices are called by the set of I/O requests transmitted by the one or more active ADAS systems; and applying at least one of a direct I/O strategy and a virtual I/O strategy to the set of I/O requests based on whether the I/O communication conflict exists, where the direct I/O strategy is applied by the processor if the I/O communication conflict does not exist and the virtual I/O strategy is applied by the processor if the I/O communication conflict does exist. Other embodiments of this aspect include corresponding computer systems, apparatus, and computer programs recorded on one or more computer storage devices, each configured to perform the actions of the methods.

Implementations may include one or more of the following features. The system further including a single hardware ECU, where the set of ADAS systems are provided by the single hardware ECU. The system where the set of ADAS systems are provided by a single ECU that executes an OS hypervisor which, when executed by the processor, generates a plurality of virtual ECUs which each provide a different ADAS system from the set of ADAS systems. The system where each virtual ECU from the plurality of ECUs includes a different OS such that the plurality of ECUs include heterogeneous OSes. The system where the vehicle is an autonomous vehicle. The system where the vehicle is a HAV. Implementations of the described techniques may include hardware, a method or process, or computer software on a computer-accessible medium.

One general aspect includes a computer program product for decreasing a latency for processing a set of I/O requests generated by one or more active ADAS systems from a set of ADAS systems of a vehicle, the computer program product including a non-transitory memory storing computer-executable code that, when executed by a processor, causes the processor to: determine situation data describing a driving situation for the vehicle; identify the one or more active ADAS systems from the set of ADAS systems for the driving situation based on the situation data and rule data that describes which ADAS systems from the set of ADAS systems are active for a plurality of driving situations; determine whether an I/O communication conflict exists for the one or more active ADAS systems based on the rule data that describes which I/O devices are called by the set of I/O requests transmitted by the one or more active ADAS systems; and apply at least one of a direct I/O strategy and a virtual I/O strategy to the set of I/O requests based on whether the I/O communication conflict exists, where the direct I/O strategy is applied by the processor if the I/O communication conflict does not exist and the virtual I/O strategy is applied by the processor if the I/O communication conflict does exist. Other embodiments of this aspect include corresponding computer systems, apparatus, and computer programs recorded on one or more computer storage devices, each configured to perform the actions of the methods.

Implementations may include one or more of the following features. The computer program product further including a single hardware ECU, where the set of ADAS systems are provided by the single hardware ECU. The computer program product where the set of ADAS systems are provided by a single ECU that executes an OS hypervisor which, when executed by the processor, generates a plurality of virtual ECUs which each provide a different ADAS system from the set of ADAS systems. The computer program product where each virtual ECU from the plurality of ECUs includes a different OS such that the plurality of ECUs include heterogeneous OSes. The computer program product where the vehicle is a HAV. The computer program product where the direct I/O strategy includes transmitting the set of I/O requests directing to one or more I/O devices which are addressed by the set of I/O requests. The computer program product where the virtual I/O strategy includes queuing the set of I/O requests in a hypervisor I/O queue of an OS hypervisor responsible for providing the set of ADAS systems via a set of virtual ECUs generated by the OS hypervisor upon being executed by the processor. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIG. 2C is a block diagram illustrating an example of rule data according to some embodiments

DETAILED DESCRIPTION

ADAS System Set

Figure 1A:
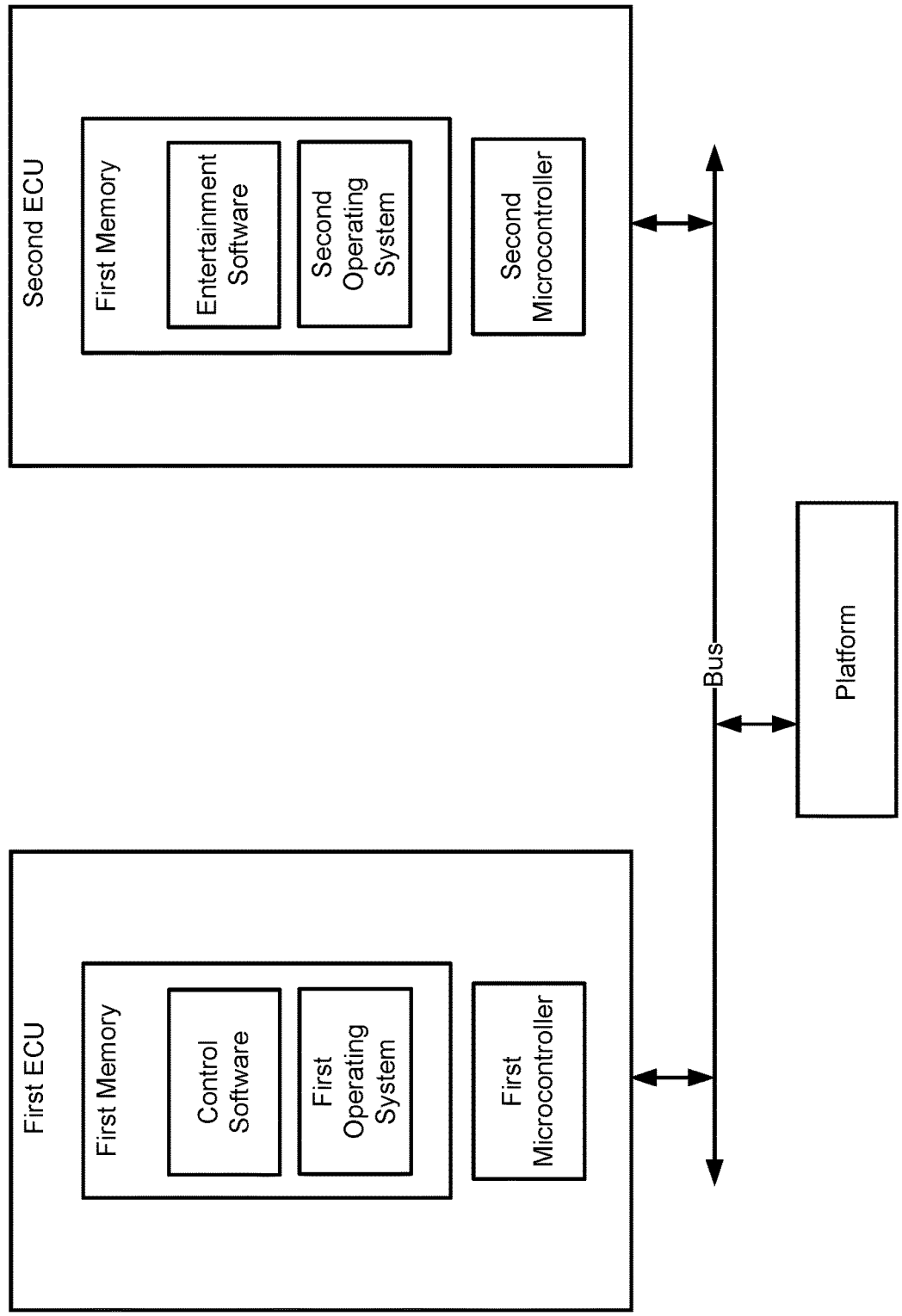
FIG. 1A is a block diagram illustrating a prior art approach to implementing control and entertainment software without the use of an OS hypervisor or a latency system.

An ADAS system set includes one or more ADAS systems. Examples of an ADAS system may include one or more of the following elements of a vehicle: an adaptive cruise control ("ACC") system; an adaptive high beam system; an adaptive light control system; an automatic parking system; an automotive night vision system; a blind spot monitor; a collision avoidance system (sometimes called a pre-collision system, or a "PCS"); a crosswind stabilization system; a driver drowsiness detection system; a driver monitoring system; an emergency driver assistance system; a forward collision warning system; an intersection assistance system; an intelligent speed adaption system; a lane departure warning system (sometimes called a lane keep assist system, or "LKA"); a pedestrian protection system; a traffic sign recognition system; a turning assistant; and a wrong-way driving warning system.

The ADAS system may also include any software or hardware included in the vehicle that makes that vehicle be an autonomous vehicle or a semi-autonomous vehicle.

DSRC-equipped Vehicle

In some embodiments, the vehicle (e.g., the vehicle 123 depicted in FIG. 1B) is a DSRC-equipped vehicle. A DSRC-equipped vehicle is a vehicle that includes the following elements: a DSRC transceiver and any software or hardware necessary to encode and transmit a DSRC message; a DSRC receiver and any software or hardware necessary to receive and decode a DSRC message; and a DSRC-compliant GPS unit. The vehicle may include a communication unit (e.g., the communication unit 145 depicted in FIG. 1B) that includes the DSRC transceiver and the DSRC receiver, as well as any software necessary for these hardware elements to provide their functionality.

Lane-level Accuracy

A DSRC-compliant GPS unit can provide GPS data (or GPS tags) describing the location of a vehicle (and instances of sensor measurements as described by the sensor data) with lane-level accuracy. Lane level accuracy may mean that the location of a vehicle is described so accurately that the vehicle's lane of travel may be accurately determined when traveling under an open sky (e.g., plus or minus 1.5 meters of the actual location of the vehicle). A conventional GPS system is unable to determine the location of a vehicle with lane-level accuracy. For example, a typical lane of a roadway is approximately 3 meters wide. However, a conventional GPS system may only have an accuracy of plus or minus 10 meters relative to the actual location of the vehicle.

A DSRC-compliant GPS unit may include hardware that wirelessly communicates with a GPS satellite to retrieve GPS data that describes a location of a vehicle with a precision that is compliant with the DSRC standard. The DSRC standard requires that GPS data be precise enough to infer if two vehicles are in the same lane. A DSRC-compliant GPS unit may be operable to identify, monitor and track its two-dimensional position within 1.5 meters of its actual position 68% of the time under an open sky. Since lanes of a roadway are typically no less than 3 meters wide, whenever the two-dimensional error of the GPS data is less than 1.5 meters the reconstruction module described herein may analyze the GPS data provided by the DSRC-compliant GPS unit and determine what lane of the roadway the vehicle is traveling in based on the relative positions of vehicles on the roadway. In this way, the DSRC-compliant GPS unit may beneficially provide GPS data with lane-level accuracy, thereby enabling the latency system to more accurately determine the driving situation for the vehicle and route I/O requests for the vehicle accordingly.

Example Overview

Referring to FIG. 1A, depicted is a prior art approach to implementing control and entertainment software without the use of an OS hypervisor or a latency system.

The first ECU is a hardware device that includes a first memory and a first microcontroller. The first memory stores control software and a first operating system compatible with the control software. The first microcontroller executes the first operating system, and the control software within the environment provided by the first operating system, to provide control functionality to the platform.

The second ECU is a hardware device that includes a second memory and a second microcontroller. The second memory stores entertainment software and a second operating system compatible with the entertainment software. The second microcontroller executes the second operating system, and the entertainment software within the environment provided by the second operating system, to provide entertainment functionality to the platform.

This approach requires two separate hardware ECUs, which is more expensive than using only one hardware ECU. This approach also does not include any functionality to manage communication conflicts that occur when the control software and the entertainment software each address separate I/O requests to the same I/O devices of the platform at the same time or contemporaneous to one another.

Figure 1B:
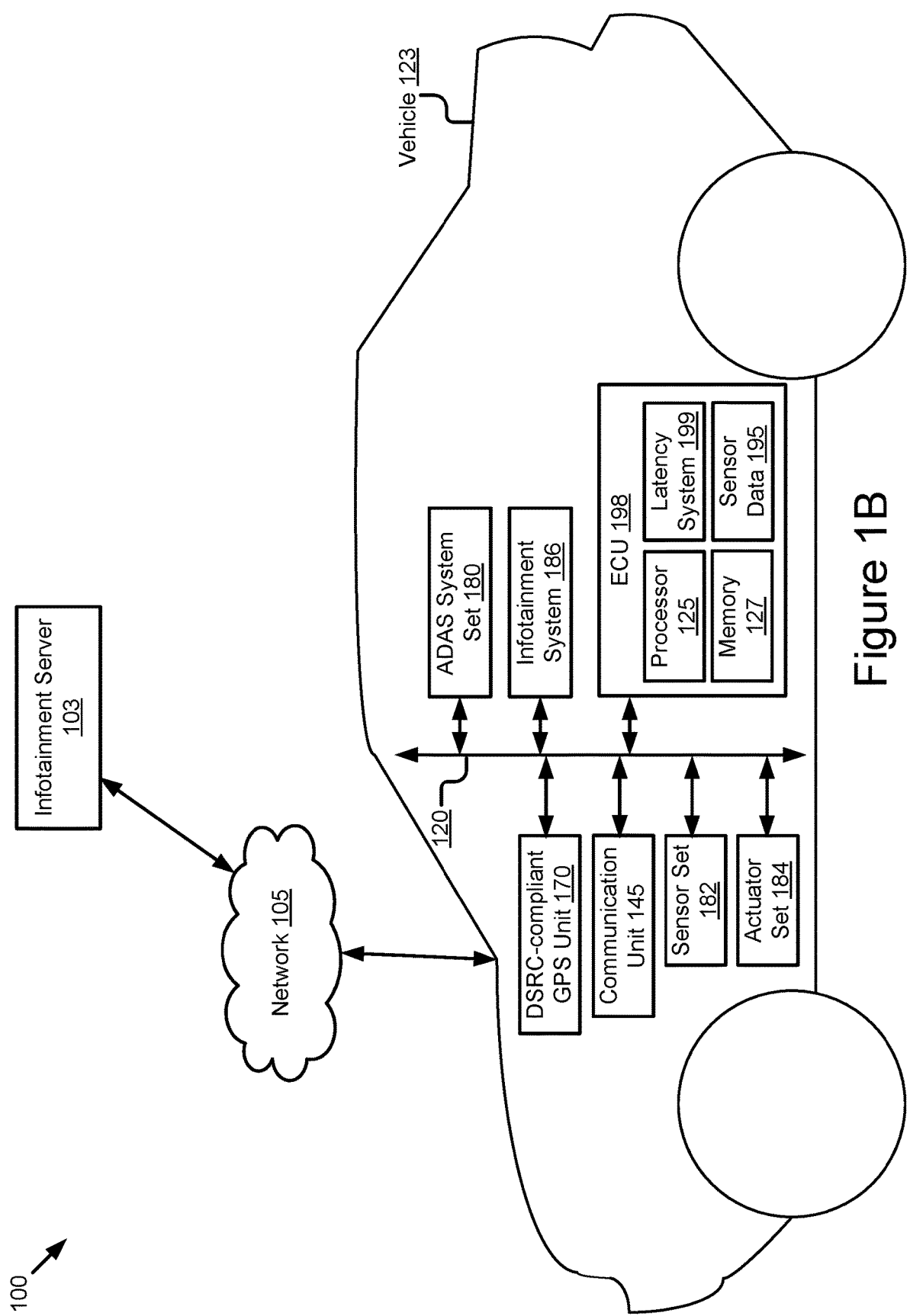
FIG. 1B is a block diagram illustrating an operating environment for a latency system to manage one or more I/O requests for an ADAS system set and an infotainment system of an ego vehicle according to some embodiments.

Referring now to FIG. 1B, depicted is an operating environment 100 for a latency system 199 to manage one or more I/O requests for an ADAS system set 180 and an infotainment system 186 of a vehicle 123 according to some embodiments.

The operating environment 100 may include one or more of the following elements: the vehicle 123; and an infotainment server 103 (herein "the server 103"). These elements of the operating environment 100 may be communicatively coupled to a network 105. Although only one vehicle 123, one server 103 and one network 105 are depicted in FIG. 1B, in practice the operating environment 100 includes one or more vehicles 123, one or more servers 103 and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, etc. The network 105 may also include a mobile data network that may include 3G, 4G, LTE, VoLTE or any other cellular network, mobile data network or combination of mobile data networks. Further, the network 105 may include one or more IEEE 802.11 wireless networks. Full-duplex communication includes the full-duplex wireless communication messages described in U.S. Pat. No. 9,369,262 filed on Aug. 28, 2014 and entitled "Full-Duplex Coordination System," the entirety of which is hereby incorporated by reference.

In some embodiments, the vehicle 123 may be DSCR-equipped. The network 105 may include one or more communication channels shared among the vehicle 123 and one or more other wireless communication devices (e.g., the server 103 or other vehicles 123 present in the operating environment 100). The communication channel may include DSRC, full-duplex wireless communication, millimeter wave communication or any other wireless communication protocol. For example, the network 105 may be used to transmit a DSRC message, DSRC probe or BSM to the server 103 (which may be, for example, and element of a roadside unit).

The vehicle 123 may include a car, a truck, a sports utility vehicle, a bus, a semi-truck, a drone or any other roadway-based conveyance. A roadway-based conveyance is a hardware devices that traverses the top surface of a roadway.

In some embodiments, the vehicle 123 may include an autonomous vehicle, a semi-autonomous vehicle or Highly Automated Vehicle ("HAV"). For example, the vehicle 123 may include a ADAS system set 180 which are operable to make the vehicle 123 an autonomous vehicle. An HAV is a vehicle 123 whose ADAS system set 180 operate at Level 3 or higher as defined by the NHTSA beginning on page 9 of their policy paper entitled "Federal Automated Vehicles Policy: Accelerating the Next Revolution in Roadway Safety," which was published in September of 2016.

The vehicle 123 may include one or more of the following elements: a sensor set 182; an actuator set 184; a hardware ECU 198; a processor 125, a memory 127; the latency system 199; a communication unit 145; a DSRC-compliant GPS unit 170; a ADAS system set 180; an infotainment system 186. These elements of the vehicle 123 may be communicatively coupled to one another via a bus 120.

In some embodiments, the vehicle 123 includes an onboard vehicle computer system (not pictured). The onboard vehicle computer system may be operable to cause or control the operation of the latency system 199. The onboard vehicle computer system may be operable to access and execute the data stored on the memory 127 to provide the functionality described herein for the latency system 199 or its elements.

In some embodiments, the sensor set 182 includes one or more of the following vehicle sensors: a camera; a millimeter wave radar; a speed sensor; a LIDAR sensor; a laser altimeter; a navigation sensor (e.g., a global positioning system sensor of the DSRC-compliant GPS unit 170); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor. The sensor set 182 may include any sensor which is present in an autonomous vehicle or an HAV.

The sensor set 182 may be operable to record data (referred to herein as "sensor data 195") that describes one or more measurements of the sensors included in the sensor set 182.

The sensor set 182 may include one or more sensors that are operable to measure the physical environment outside of the vehicle 123. For example, the sensor set 182 may record one or more physical characteristics of the physical environment that is proximate to the vehicle 123. The measurements recorded by the sensor set are described by sensor data 195 which are stored in the memory 127 of the vehicle.

In some embodiments, the sensor data 195 may describe the physical environment proximate to the vehicle at one or more times. The sensor data 195 may be timestamped by the sensors of the sensor set 182 or the latency system 199. The sensor data 195 is stored in the memory 127.

In some embodiments, the sensor set 182 includes various sensors such as cameras, LIDAR, range finders, radar, etc. that are operational to measure, among other things: (1) the physical environment, or roadway environment, where the vehicle 123 is located as well as the static objects within this physical environment; (2) the dynamic objects within the physical environment and the behavior of these dynamic objects; (3) the position of the vehicle 123 relative to static and dynamic objects within the physical environment (e.g., as recorded by one or more range-finding sensors of the sensor set 182 such as LIDAR); (4) the weather within the physical environment over time and other natural phenomenon within the physical environment over time; (5) coefficients of friction and other variables describing objects (static and dynamic) within the physical environment over time; and (6) the operation of the ADAS system set 180 in response to the static and dynamic objects over time. One or more of these measurements are described by the sensor data 195. The sensor data 195 may include a timestamp for one or more of the measurements of the sensors included in the sensor set 182.

The actuator set 184 includes one or more actuators of the vehicle 123. For example, the actuator set 184 includes one or more of the following: one or more hydraulic actuators; one or more electric actuators; one or more thermal actuators; one or more magnetic actuators; one or more shape memory alloys configured in the vehicle 123 to operate as an actuator; and one or more mechanical actuators.

The hardware ECU 198 is a hardware electronic control unit. As depicted in FIG. 1B, the ECU 198 includes the following elements: the memory 127; the sensor data 195 (which may be stored on the memory 127); the processor 125; and the latency system 199.

The memory 127 is a non-transitory computer-readable memory. The memory 127 stores instructions or data that may be executed by the processor 125. The instructions or data may include code for performing the techniques described herein. The memory 127 stores any data or information necessary for the latency system 199 to provide its functionality. For example, the memory 127 stores the sensor data 195. In some embodiments, the memory 127 also stores GPS data (e.g., the GPS data 293 depicted in FIG. 2A) that describes the geographic location of the vehicle 123 at a specific time as determined by the DSRC-compliant GPS unit 170 (such that the geographic location has lane-level accuracy). In some embodiments, the memory 127 stores one or more of the following digital data elements depicted in FIG. 2A: the sensor data 295; the GPS data 293; map data 291; situation data 289; rule data 287 and virtual ECU data 285.

In some embodiments, the memory 127 may be a dynamic random access memory (DRAM) device, a static random access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer ("CISC") architecture, a reduced instruction set computer ("RISC") architecture, or an architecture implementing a combination of instruction sets. Although FIG. 1B includes a single processor 125, multiple processors may be included in the vehicle 123 (and the server 103). Other processors, operating systems, sensors, displays, and physical configurations may be possible.

The communication unit 145 transmits and receives data to and from a network 105 or to another communication channel. In some embodiments, the communication unit 145 may include a DSRC transceiver, a DSRC receiver and other hardware or software necessary to make the vehicle 123 a DSRC-enabled device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. Pat. No. 9,369,262 filed on Aug. 28, 2014 and entitled "Full-Duplex Coordination System"; or another suitable wireless communication method.

In some embodiments, the communication unit 145 includes a full-duplex coordination system as described in U U.S. Pat. No. 9,369,262 filed on Aug. 28, 2014 and entitled "Full-Duplex Coordination System."

In some embodiments, the communication unit 145 includes a cellular communications transceiver for sending and receiving data over a cellular communications network including via short messaging service ("SMS"), multimedia messaging service ("MMS"), hypertext transfer protocol ("HTTP" or "HTTPS" if the secured implementation of HTTP is used), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The latency system 199 is described in more detail below.

The DSRC-compliant GPS unit 170 includes hardware that wirelessly communicates with a GPS satellite to retrieve GPS data 293 that describes a location of the vehicle 123 at a given time. In some embodiments, a DSRC-compliant GPS unit 170 is operable to provide GPS data (e.g., the GPS data 293 depicted in FIG. 2A) that describes the location of the vehicle 123 to a lane-level degree of precision. The DSRC standard requires that GPS data be precise enough to infer if two vehicles (such as vehicle 123 and another vehicle on the same roadway as the vehicle 123) are in the same lane at the same time.

In some embodiments, the DSRC-compliant GPS unit 170 is operable to identify, monitor and track its two-dimensional position within 1.5 meters of its actual position 68% of the time under an open sky. Since lanes of a roadway are typically no less than 3 meters wide, whenever the two-dimensional error of the GPS data is less than 1.5 meters the latency system 199 may analyze the GPS data provided by the DSRC-compliant GPS unit 170 and determine what lane of the roadway the vehicle 123 is traveling in based on the relative positions of vehicles on the roadway.

By comparison, a GPS unit which is not compliant with the DSRC standard is far less accurate than the DSRC-compliant GPS unit 170 and not capable of reliably providing lane-level accuracy, as is the DSRC-compliant GPS unit 170. For example, a non-DSRC-compliant GPS unit may have an accuracy on the order of 10 meters, which is not sufficiently precise to provide the lane-level degree of precision provided by the DSRC-compliant GPS unit 170. For example, since a lane may be as narrow as 3 meters wide, the DSRC standard may require a DSRC-compliant GPS unit 170 to have an accuracy on the order of 1.5 meters, which is significantly more precise than a non-DSRC-compliant GPS unit as described above. As a result, a non-DSRC-compliant GPS unit may not be able to provide GPS data that is accurate enough to enable the latency system 199 to accurate determine the driving scenario that the vehicle 123 is experiencing or about to experience, and so, the latency system may inaccurately assign urgency values and route I/O requests for as described below with reference to FIGS. 3A, 3B and 3C. The imprecision of a non-DSRC-compliant GPS unit may therefore render the functionality of the latency system 199 inoperable since the I/O routing decisions made by the latency system 199 would be inaccurate in some situations and risk the loss of human life resulting from the vehicle 123 colliding with another object or some other accident that would have been avoided with GPS data having lane-level accuracy.

The vehicle 123 includes a ADAS system set 180, which collectively form an autonomous system. Each ADAS system 180 provides one or more autonomous features to the vehicle 123.

In some embodiments, the ADAS system set 180 included in the vehicle 123 render the vehicle 123 a Highly Automated Vehicle ("HAV"). An HAV is a vehicle whose ADAS system set 180 operate at Level 3 or higher as defined by the NHTSA on page 9 of their policy paper entitled "Federal Automated Vehicles Policy: Accelerating the Next Revolution in Roadway Safety," which was published in September of 2016. Accordingly, in some embodiments the vehicle 123 is a HAV. In this way, the vehicle 123 may be an HAV and also DSRC-enabled as described above.

The ADAS system set 180 includes one or more ADAS systems. An ADAS system from the ADAS system set 180 is referred to herein individually or collectively as "an ADAS system," "the ADAS system," "the ADAS systems," "the one or more ADAS systems" or "the plurality of ADAS systems."

The one or more ADAS systems may include one or more advanced driver assistance systems. Examples of an ADAS system may include one or more of the following elements of the vehicle 123: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

In some embodiments, the ADAS system set 180 includes any hardware or software that controls one or more operations of the vehicle 123 so that the vehicle 123 is "autonomous" or "semi-autonomous."

In some embodiments, the ADAS system set 180 includes any hardware or software that controls one or more operations of the vehicle 123 so that the vehicle 123 is an HAV.

The infotainment system 186 includes one or more of the following: one or more in-car entertainment systems of the vehicle 123; and one or more in-car infotainment systems of the vehicle 123. In some embodiments, the infotainment system 186 includes one or more of the following: a navigation system; a video streaming vehicle; a music streaming device; a carputer; a tablet computing device installed within the vehicle as an infotainment device; a network-enabled computing device communicatively coupled to a heads-up display unit or some other electronic display device; and etc.

In some embodiments, the infotainment system 186 causes the communication unit 145 to retrieve data from the infotainment server 103 via the network 105. The data is stored in the memory 127 or some other non-transitory memory of the vehicle 123. The infotainment system 186 then provides infotainment functionality to a driver of the vehicle based at least in part on the data provided by the infotainment server 103. For example, the data provided by the infotainment server 103 may include infotainment data including digital data describing infotainment content (e.g., a movie, music, live television, etc.) including one or more of the following: (1) images that are displayed by an electronic display of the vehicle; and (2) audio which is recreated by one or more speakers of the vehicle 123.

In some embodiments, the latency system 199 includes code and routines that are operable, when executed by the processor 125, to selects one of two different routing strategies for managing one or more I/O requests for an OS hypervisor of the hardware ECU 198. A first routing strategy for managing one or more I/O requests is referred to herein as "virtual I/O" and depicted in FIG. 4A. A second routing strategy for managing one or more I/O requests is referred to herein as "direct I/O" and depicted in FIG. 4B.

As a first ADAS system executes (a "first execution"), it generates one or more I/O requests that are addressed to one or more I/O devices (e.g., sensors or actuators of the vehicle 123). A second ADAS system or the infotainment system may be executing contemporaneous to the execution of the first ADAS system (a "second execution"). This second execution may produce one or more I/O requests that are addressed to one or more I/O devices that are the same as those addressed by the first execution, thereby creating an I/O communication conflict. The latency system 199 solves this problem.

For example, the latency system 199 described herein includes codes and routines which, when executed by the processor 125, causes the processor 125 to execute one or more of the following steps: (1) determine whether one or more I/O requests generated by the second execution creates an I/O communication conflict with the first execution; (2) if no I/O communication conflict is present, directly routing the I/O requests to the I/O devices which they address (see, e.g., FIG. 4B which depicts an example of direct I/O according to some embodiments); and (3) if an I/O communication conflict is present, (i) assign an urgency value for individual I/O requests of the first execution and the second execution based on whether the vehicle feature these I/O requests are associated with providing is associated with safety, (ii) place the conflicted I/O requests in a hypervisor I/O queue of the OS hypervisor; and (iii) process the I/O request in the hypervisor I/O queue based on the relative urgency values for the queued I/O requests (see, e.g., FIG. 4A which depicts an example of virtual I/O according to some embodiments).

In some embodiments, the latency system 199 includes code and routines that, when executed by the processor 125, causes the processor 125 to execute one or more of the steps of the method 300 described below with reference to FIG. 3A.

In some embodiments, the latency system 199 includes code and routines that, when executed by the processor 125, causes the processor 125 to execute one or more of the steps of the method 399 described below with reference to FIGS. 3B and 3C.

The functionality of the latency system 199 is described in more detail below with reference to FIGS. 2, 3A, 3B, 3C, 4A and 4B.

In some embodiments, the latency system 199 may be implemented using hardware including a field-programmable gate array ("FPGA") or an application-specific integrated circuit ("ASIC"). In some other embodiments, the latency system 199 may be implemented using a combination of hardware and software. The latency system 199 may be stored in a combination of the devices of the operating environment 100 (e.g., vehicles, servers or other devices such as a smartphone of the driver of the vehicle 123), or in one of the devices.

Although not depicted in FIG. 1B, in some embodiments the vehicle 123 may include a full-duplex coordination system as described in U.S. Pat. No. 9,369,262 and entitled "Full-Duplex Coordination System."

The server 103 is a processor-based computing device. For example, the computing device may include a stand-alone hardware server. The server 103 is communicatively coupled to the network 105. The server 103 may include a non-transitory memory that stores infotainment data. The server may receive requests for infotainment data via the network 105 and respond to these requests by transmitting infotainment data via the network 105 that is responsive to these requests.

Figure 2A:
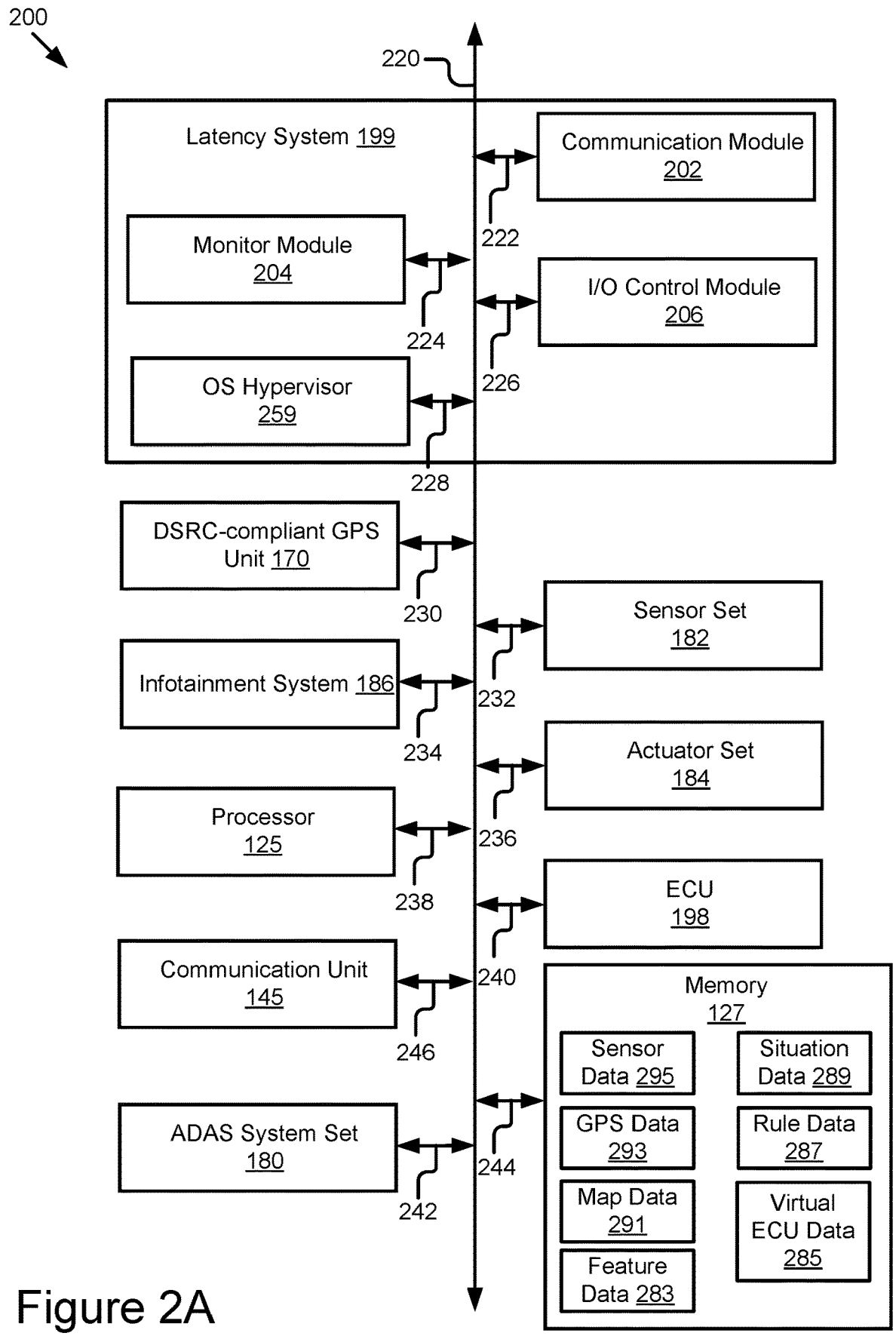
FIGS. 2A and 2B are block diagrams illustrating example computer systems including a latency system according to some embodiments.

Referring now to FIG. 2A, depicted is a block diagram illustrating an example computer system 200 including a latency system 199 according to some embodiments.

In some embodiments, the computer system 200 may include a special-purpose computer system that is programmed to perform one or more steps of a method 300 described below with reference to FIG. 3A or a method 399 described below with reference to FIGS. 3B and 3C.

In some embodiments, the computer system 200 is an element of the vehicle 123. For example, the computer system 200 is an onboard vehicle computer system of the vehicle 123.

The computer system 200 may include one or more of the following elements according to some examples: the latency system 199; the processor 125; the communication unit 145; the memory 127; the DSRC-compliant GPS unit; the infotainment system 186; the ADAS system set 180; the sensor set 182; the actuator set 184; and the hardware ECU 198. The components of the computer system 200 are communicatively coupled by a bus 220.

In the illustrated embodiment, the processor 125 is communicatively coupled to the bus 220 via a signal line 238. The communication unit 145 is communicatively coupled to the bus 220 via a signal line 246. The memory 127 is communicatively coupled to the bus 220 via a signal line 244. The DSRC-compliant GPS unit 170 is communicatively coupled to the bus 220 via a signal line 230. The infotainment system 186 is communicatively coupled to the bus 220 via a signal line 234. The ADAS system set 180 is communicatively coupled to the bus 220 via a signal line 242. The sensor set 182 is communicatively coupled to the bus 220 via a signal line 232. The actuator set 184 is communicatively coupled to the bus 220 via a signal line 236. The ECU is communicatively coupled to the bus 220 via a signal line 240.

The following elements of the computer system 200 were described above with reference to FIG. 1B, and so, those descriptions will not be repeated here: the processor 125; the communication unit 145; the memory 127; the DSRC-compliant GPS unit; the infotainment system 186; the ADAS system set 180; the sensor set 182; the actuator set 184; and the hardware ECU 198.

The memory 127 stores any data necessary for the latency system 199 to provide its functionality. For example, the memory 127 stores any of the data described above with reference to FIG. 1B or below with reference to FIGS. 2B, 2C, 3A, 3B, 3C, 4A and 4B.

In the embodiment depicted in FIG. 2 the memory 127 stores the following digital data: sensor data 295; GPS data 293; map data 291; situation data 289; rule data 287; virtual ECU data 285; and feature data 283.

The sensor data 295 includes digital data that describes the roadway environment outside an ego vehicle (i.e., the vehicle 123), the location of remote vehicles, other objects in the roadway environment relative to the ego vehicle and the operational status of the ego vehicle (e.g., kinematic data for the vehicle 123 and whether any faults or alerts are detected for the vehicle 123 by one of the onboard vehicle computers of the vehicle 123).

In some embodiments, the ego vehicle is the vehicle that includes the computer system 200. In some embodiments, roadway environment includes the physical environment where an ego vehicle including the computer system 200 is located, including a roadway upon which the ego vehicle travels.

In some embodiments, the operational status of the ego vehicle is information described by the sensor data 295 that describes one or more of the following: kinematic data for the vehicle 123; whether any faults or alerts are detected for the vehicle 123 by one of the onboard vehicle computers of the vehicle 123; the latitude and longitude of the vehicle 123; the heading of the vehicle 123; the breaking system status of the vehicle 123 (e.g., data describing whether the breaks are engaged); the elevation of the vehicle 123; the current time for the vehicle 123; the speed of the vehicle 123; the steering angle of the vehicle 123; the acceleration of the vehicle 123 as indicated by three axes of acceleration and the yaw rate of the vehicle 123; the path history of the vehicle 123; an estimate of the further path of the vehicle 123; whether the traction control system of the vehicle 123 has been engaged for 100 milliseconds or more in the past 0.1 seconds; whether the antilock braking system of the vehicle 123 has been engaged for 100 milliseconds or more in the past 0.1 seconds; whether the vehicle head lamps are one; whether the vehicle windshield wipers are on; the make, model and trim level of the vehicle 123; and any other data that is required to be included in a basic safety message of the vehicle 123 as required by the DSRC standard.

The GPS data 293 includes digital data that describes the geographic location of the ego vehicle (e.g., the vehicle 123 which includes the computer system 200). In some embodiments, the GPS data 293 may be received from one or more GPS satellites by the DSRC-compliant GPS unit 170. The GPS data 293 may describe a latitude and longitude of the ego vehicle with lane-level accuracy.

The map data 291 includes digital data that describes, for different combinations of latitude and longitude as indicated by the GPS data 293, different geographical features of the roadway environment indicated by the GPS data 293 such as the presence of curves in the roadway, whether this a bumpy road, the average vehicular speeds along the roadway at different times of day, etc.

The monitor module 204 analyzes one or more of the sensor data 295, the GPS data 293 and the map data 291 and determines the situation data 289 based on these inputs. The situation data 289 includes digital data that describes the current driving situation of ego vehicle as determined by the monitor module 204.

In some embodiments, the monitor module 204 continues to track the sensor data 295, GPS data 293 and the map data 291 over time. As time passes, the current driving situation of the ego vehicle changes. When this change occurs, the monitor module 204 updates the situation data 289 to reflect the new driving situation of the ego vehicle.

The rule data 287 includes digital data that describes a rule table (or some other data structure) which describes the following: (1) different vehicle features installed in the ego vehicle (e.g., different ADAS systems or infotainment systems installed in the vehicle 123), (2) the different sensors of the sensor set 182 used by these different vehicle features; (3) different "criteria" relevant to the vehicle features installed in the ego vehicle (e.g., criteria for triggering an ADAS system of the ADAS system set 180 to take action by providing it's ADAS functionality, or the criteria required for an infotainment system 186 to provide it's infotainment functionality, etc.); and (4) a threshold associated with the criteria (e.g., a threshold that is relevant to the triggering of the ADAS system of the ADAS system set 180 to provide it's ADAS functionality, or a threshold relevant to triggering the infotainment system 186 to provide its infotainment functionality, etc.).

The monitor module 204 uses the rule table described by the rule data 287 to identify when the current driving situation of the ego vehicle indicates that a particular ADAS system is likely to be used in the near future, and as such, is relevant to the current driving situation described by the situation data 289. An example of the rule data 287 is depicted in FIG. 2C.

The virtual ECU data 285 includes digital data that, when executed by the processor 125, causes the processor 125 to generate one or more virtual ECUs which operate on the hardware ECU 198 and include their own operating systems. For example, see FIGS. 2B, 4A and 4B which each include a hardware ECU 198 executing different virtual ECUs having their own operating systems. The operating systems operate on the virtual ECUs, which themselves operate on the hardware ECU 198. The virtual ECU data 285 includes digital data for generating the one or more virtual ECUs and the one or more operating systems.

The feature data 283 includes digital data describing the one or more vehicle features that are implemented responsive to the current driving situation described by the situation data 289

In the illustrated embodiment shown in FIG. 2A, the latency system 199 includes a communication module 202, a monitor module 204, an I/O control module 206, and an OS hypervisor 259. These components of the latency system 199 are communicatively coupled to each other via a bus 220.

In some embodiments, components of the latency system 199 can be stored in a single server or device. In some other embodiments, components of the latency system 199 can be distributed and stored across multiple servers or devices. In some embodiments, the latency system 199 is an element of the hardware ECU 198.

The communication module 202 can be software including routines for handling communications between the latency system 199 and other components of the computer system 200. In some embodiments, the communication module 202 can be a set of instructions executable by the processor 125 to provide the functionality described below for handling communications between the latency system 199 and other components of the computer system 200 of FIG. 2A or the computer system 201 of FIG. 2B.

The communication module 202 sends and receives data, via the communication unit 145, to and from one or more elements of the operating environment 100. For example, the communication module 202 receives or transmits, via the communication unit 145, infotainment data which is stored on the memory 127.

In some embodiments, the communication module 202 receives data from components of the latency system 199 and stores the data in the memory 127. For example, the communication module 202 receives any of the data described above with reference to the memory 127 and stores this data in the memory 127.

In some embodiments, the communication module 202 may handle communications between components of the latency system 199. For example, the communications module 202 may handle communications among the monitor module 204, the I/O control module 206 and the OS hypervisor 259. Any of these modules may cause the communication module 202 to communicate with the other elements of the computer system 200 of FIG. 2A or the computer system 201 of FIG. 2B.

For example, the monitor module 204 may use the communication module 202 to communicate with the sensor set 182, the DSRC-compliant GPS unit 170 and the memory 127 so that monitor module 204 can analyze the sensor data 295, the GPS data 293 and the map data 291 to generate the situation data 289.

In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The monitor module 204 can be software including routines for causing the processor 125 to execute steps including: (1) monitoring the current driving situation of the ego vehicle (referred to below as "step (1)"); and (2) identifying if the current driving situation is relevant to one or more of the ADAS systems of the ADAS system set 180 installed in the ego vehicle (referred to below as "step (2)").

Regarding step (1), monitoring the current driving situation of the vehicle, the monitor module 204 includes code and routines that are operable, when executed by the processor 125, to cause the processor to access one or more of the following digital data which is stored on the memory 127: the sensor data 295 collected by the vehicle sensors included in the sensor set 182; the GPS data 293 that describes the current location of the ego vehicle; and the map data 291 that describes geographic or roadway features that are associated with the GPS data 293.

In some embodiments, the monitor module 204 includes code and routines that are operable, when executed by the processor 125, to cause the processor 125 to generate situation data 289 that describes the current driving situation of the ego vehicle based on one or more of the following: (1) the sensor data 295; (2) the GPS data 293; and (3) the map data 291.

The monitor module 204 causes the communication module 202 to store the situation data 289 in the memory 127.

In some embodiments, monitor module 204 may include code and routines that are operable, when executed by the processor 125, to cause the processor to continue to track the sensor data 295, the GPS data 293 and the map data 291 over time. As time passes, the current driving situation of the ego vehicle changes. When this change occurs, the monitor module 204, upon execution by the processor 125, causes the processor 125 to determine one or more updates for the situation data 289 to reflect the new driving situation of the ego vehicle as indicated by the new sensor data 295, the new GPS data 293 and the new map data 291 which has changed over time.

Regarding step (2), identifying if the current driving situation is relevant to one or more of the ADAS systems of the ADAS system set 180 installed in the ego vehicle, the monitor module 204 includes code and routines that are operable, when executed by the processor 125, to cause the processor to monitor the situation data 289 describing the current driving situation of the ego vehicle and determine, for a current driving situation, what ADAS features or ADAS systems are likely to be relevant to the current driving situation or a driving situation occurring in the near future as indicated by the current driving situation.

In some embodiments, an ADAS feature or ADAS system is relevant to the current driving situation (or the driving situation occurring in the near future) if it is likely to be used while this current driving situation is present (or while the driving situation occurring in the near future is present).

For example, assume that an ego vehicle is equipped with the pre-collision system, which is a type of ADAS system referred to as a "PCS." The features of this particular ADAS system are likely to be used when the current driving situation indicates that the ego vehicle is approaching a pedestrian (as well as other driving situations indicating a pending vehicle collision if remedial action is not taken). The monitor module 204 retrieves the rule data 287 which describes one or more of the following: (1) different vehicle features installed in the ego vehicle (e.g., different ADAS systems or infotainment systems); (2) the different sensors of the sensor set 182 used by these different vehicle features; (3) different "criteria" relevant to the vehicle feature (e.g., criteria for triggering an ADAS feature/ADAS system to take action, criteria required for an infotainment system to provide its functionality, etc.); and (4) a threshold associated with the criteria (e.g., a threshold that is relevant to the triggering of the ADAS feature/ADAS system, a threshold relevant to providing an infotainment feature, etc.). The monitor module 204 uses this rule data 287 to identify when the current driving situation of the ego vehicle indicates that a particular ADAS feature/ADAS system is likely to be used in the near future, and as such, is relevant to the current driving situation described by the situation data 289. See FIG. 2C for an example of the rule data 287 according to some embodiments.

Based on analysis of the rule data 287 and the situation data 289, the monitor module 204, upon being executed by the processor 125, causes the processor 125 to determine which vehicle features are implemented responsive to the current driving situation described by the situation data.

In some embodiments, the monitor module 204 includes code and routines that, upon being executed by the processor 125, causes the processor 125 to generate feature data 283 that includes digital data describing the one or more vehicle features that are implemented responsive to the current driving situation described by the situation data 289. The monitor module 204, upon being executed by the processor 125, causes the communication module 202 to store this feature data 283 in the memory 127. As described below, the I/O control module 206 includes code and routines that, when executed by the processor 125, causes the processor 125 to retrieve the feature data 283 from the memory 127 and determine how to manage the I/O requests associated with the vehicle feature described by the feature data 283 based on (1) the urgency of the vehicle feature and (2) the presence of one or more I/O communication conflicts.

The urgency of the vehicle feature relates to whether the vehicle feature is associated with something more important, such as passenger safety, or something less important, such as passenger entertainment or infotainment.

The presence of I/O communication conflicts are identified by the I/O control module 206 based on the other vehicle features that are currently active at the same time as the particular vehicle feature described by the feature data 283 and a commonality of the sensors, actuators and/or other devices that are contemporaneously used by these other vehicle features and the particular vehicle feature described by the feature data 283.

In some embodiments, the monitor module 204 can be stored in the memory 127 of the computer system 200 and can be accessible and executable by the processor 125. The monitor module 204 may be adapted for cooperation and communication with the processor 125 and other components of the computer system 200 via the signal line 224.

As described above, implementing the OS hypervisor 259 introduces a bottlenecking problem for managing I/O requests which are generated by one or more of: the one or more ADAS systems; and the one or more infotainment systems 186.

Figure 4A:
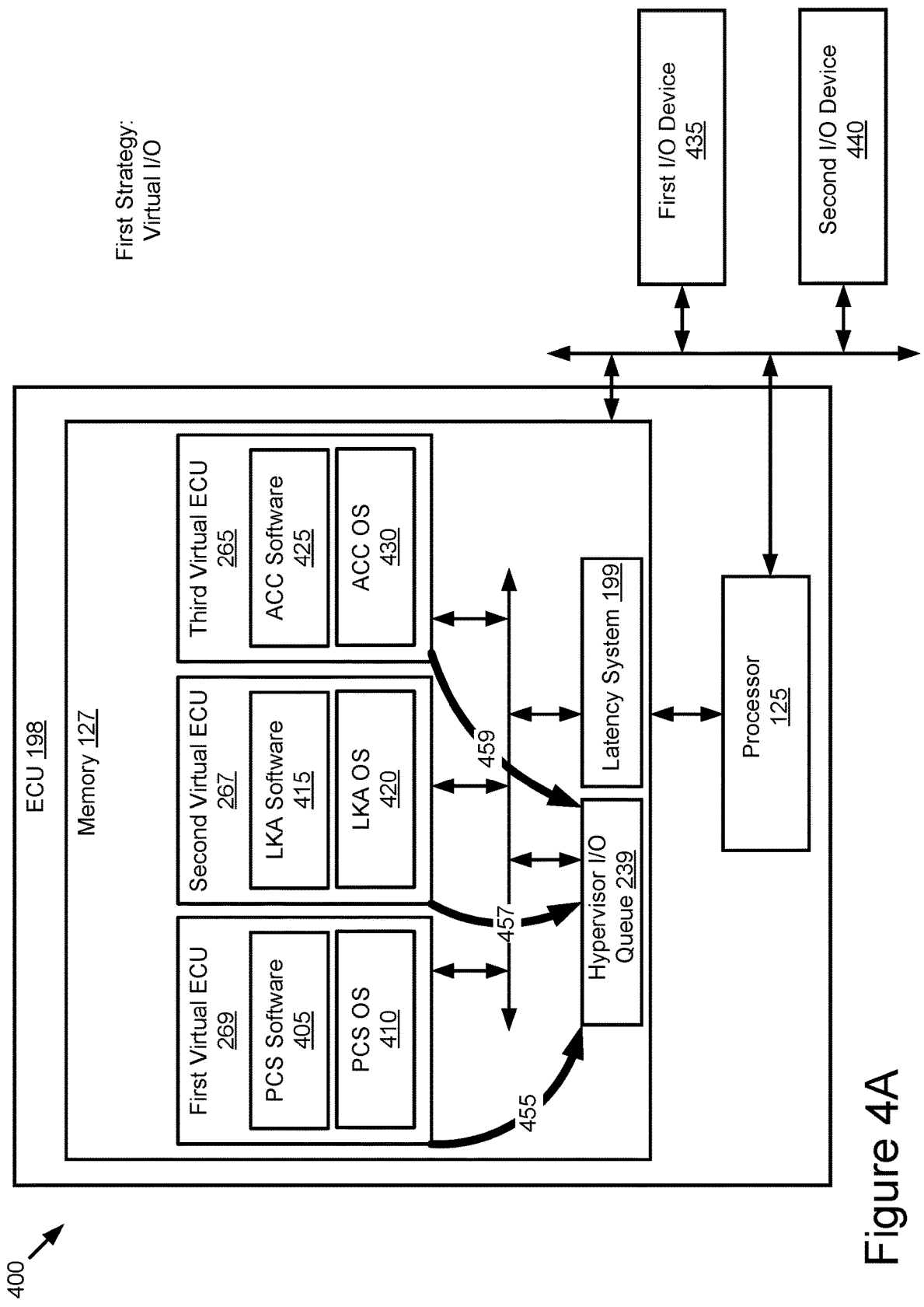
FIG. 4A is a block diagram of an example virtual I/O strategy implemented by the latency system according to some embodiments.

The I/O control module 206 implements one of two different routing strategies for managing the I/O requests for the OS hypervisor 259 so that the bottlenecking problem is decreased or eliminated: direct I/O (see, e.g., FIG. 4B); and virtual I/O (see, e.g., FIG. 4A).

The I/O control module 206 includes software and routines that, when executed by the processor 125, causes the processor 125 to determine which of these two different routing strategies are applied to the I/O requests.

As described above, the monitor module 204 determines which vehicle features are implemented responsive to the current driving situation. The monitor module 204 generates feature data 283 that describes the vehicle features that are implemented responsive to the current driving situation. The monitor module 204 causes the communication module 202 to store the feature data 283 in the memory 127.

The I/O control module 206 can be software including routines that, when executed by the processor 125, cause the processor 125 to retrieve the feature data 283 and the rule data 287 from the memory 127. The rule data 287 describes which sensors and actuators are used by the vehicle feature described by the feature data 283. The I/O control module 206 uses the rule data 287 to identify the sensor and actuator dependency used by the vehicle feature described by the feature data 283 (see, e.g., the second column from the left of the rule data 287 depicted in FIG. 2C). In some embodiments, the I/O control module 206 repeats this process for other vehicle features that are currently active (or are likely to be active in the near future based on the current driving situation) so that, for any point in time (or range of time), the I/O control module 206 is able to identify each of the sensor and actuator dependencies for the vehicle features that are currently active at this point in time (or range in time) or are likely to be active in the near future based on the current driving situation.

In some embodiments, the I/O control module 206 includes code and routines that are operable, when executed by the processor 125, to cause the processor to assign an urgency value to each vehicle feature described in the preceding paragraph based, for example, on whether a particular vehicle feature is associated with safety or merely entertainment or infotainment. The urgency value is described by urgency data. The I/O control module 206 includes code and routines that are operable, when executed by the processor 125, to cause the processor 125 to generate urgency data describing the urgency value for the different I/O requests. The I/O control module 206 includes code and routines that are operable, when executed by the processor 125, to cause the processor 125 to instruct the communication module 202 to store the urgency data in the memory 127.

In some embodiments, I/O requests are assigned an urgency value that is the same as the urgency value assigned to the vehicle feature which they help to implement. For example, if the ADAS functionality of an ACC system is assigned a particular urgency value for a period of time, then the I/O requests generated by the ACC system are assigned this same particular urgency value which was assigned to the ACC system for the same period of time as that the ACC system is assigned this particular urgency value.

The I/O control module 206 includes code and routines that are operable, when executed by the processor 125, to cause the processor 125 to analyze the sensor dependencies and actuator dependencies for each of the vehicle features that are currently active or likely to be active in the near future to identify the presence of overlapping dependency of the sensors and actuators (i.e., I/O devices) for each active vehicle feature, thereby indicating the presence of an I/O communication conflict. The I/O control module 206 includes code and routines that are operable, when executed by the processor 125, to cause the processor 125 to generate conflict data that describes the presence of each I/O communication conflict and the vehicle functions and I/O devices that are affected by each I/O communication conflict. The I/O control module 206 includes code and routines that are operable, when executed by the processor 125, to cause the processor 125 to instruct the communication module 202 to store the conflict data in the memory 127.

The I/O control module 206 includes code and routines that are operable, when executed by the processor 125, to cause the processor 125 to determine which routing strategy to implement in order to achieve the goal of decreasing or minimizing the latency of I/O requests for the vehicle features that are currently active or likely to the active in the near future based on the current driving situation. This decrease or minimization of I/O latency may be considered by the I/O control module 206 on a per I/O requests basis or considering the cumulative I/O requests as a whole at any given time or period of time.

As described above, a first routing strategy is referred to as "virtual I/O" and a second routing strategy is referred to as "direct I/O."

Generally speaking, the virtual I/O routing strategy means that the I/O requests for a particular vehicle feature are placed in a hypervisor I/O queue of the OS hypervisor 259 and processed based in part on the urgency of the particular vehicle feature which originated the particular I/O request relative to the urgency of other I/O requests in the hypervisor I/O queue.

Generally speaking, the direct I/O routing strategy means that the I/O requests for the particular vehicle feature are routed directly to the sensor or actuator which is called (or addressed) by each particular I/O request so that the I/O requests for this particular vehicle feature are never placed in the hypervisor I/O queue for a period of time to be determined by the I/O control module 206 based on the current driving situation. Direct I/O permission reduces I/O latency compared to virtual I/O because in virtual I/O the individual I/O requests are placed in the hypervisor I/O queue and some delay occurs before they are processed (e.g., released from the hypervisor I/O queue).

In some embodiments, the I/O control module 206 can be stored in the memory 127 of the computer system 200 and can be accessible and executable by the processor 125. The I/O control module 206 may be adapted for cooperation and communication with the processor 125 and other components of the computer system 200 via signal line 226.

The OS hypervisor 259 includes software and routines that, when executed by the processor 125, generate one or more virtual ECUs based on the virtual ECU data 285. Each of the virtual ECUs includes an operating system and software for providing a vehicle feature. In embodiments where a plurality of ECUs are generated by the OS hypervisor 259, the operating systems implemented across the plurality of ECUs may be heterogenous (i.e., "guest OS" if singular, "guest OSes" if plural). The OS hypervisor 259 is beneficial because it provides flexibly for adding or removing guest OSes as well as isolation among different guest OSes. The virtual ECU data 285 may include the code and routines for providing the one or more virtual ECUs, the one or more guest OSes and the different vehicle features.

In some embodiments, the OS hypervisor 259 can be stored in the memory 127 of the computer system 200 and can be accessible and executable by the processor 125. The OS hypervisor 259 may be adapted for cooperation and communication with the processor 125 and other components of the computer system 200 via signal line 228.

Figure 2B:
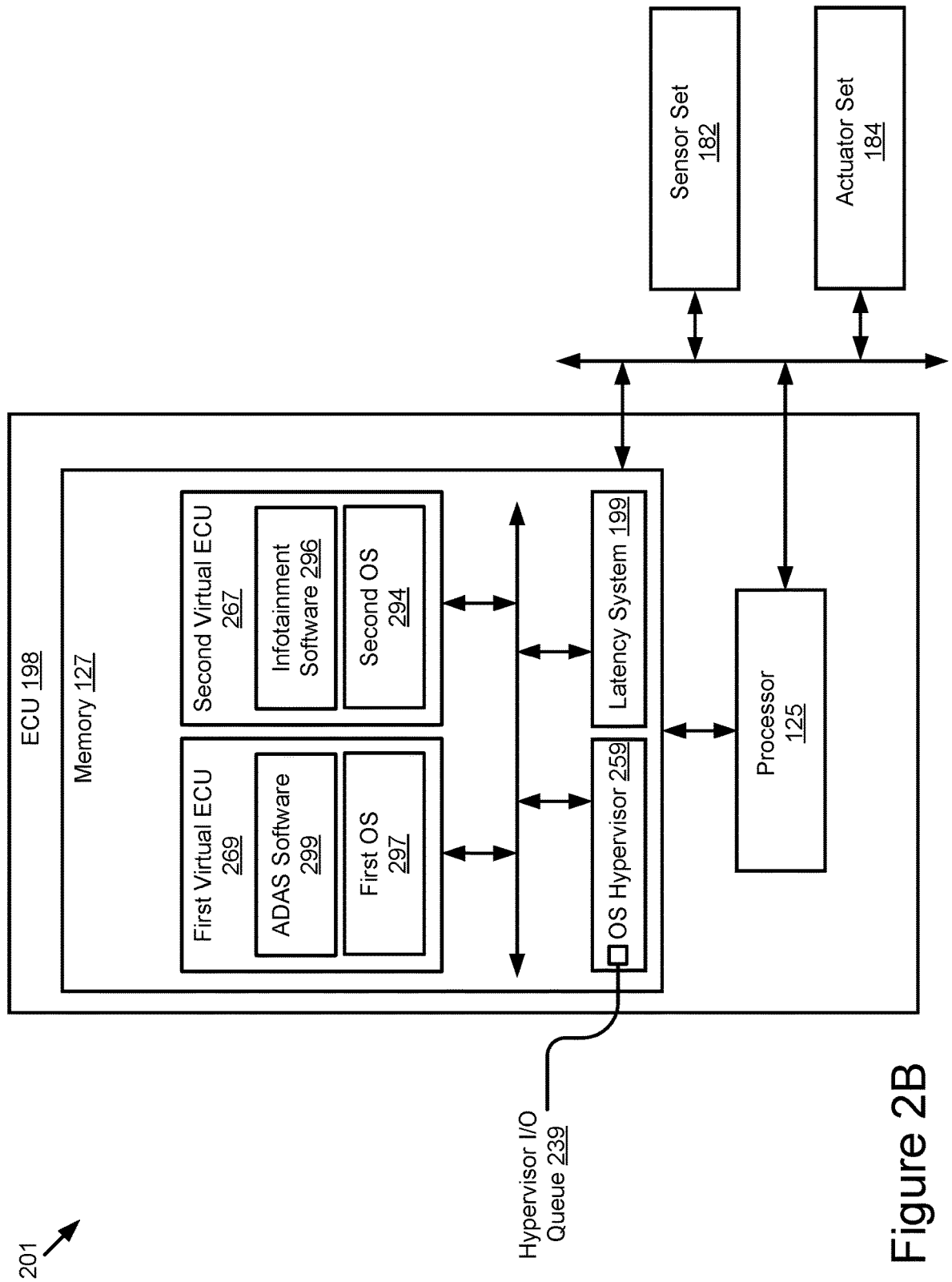

Referring now to FIG. 2B, depicted is an example of a computer system 201 including a latency system 199. This computer system 201 includes the memory 127 in which a first virtual ECU 269 and a second virtual ECU 267 are being generated by the OS hypervisor 259 responsive to being executed by the processor 125 using the virtual ECU data as a file input for the OS hypervisor 259.

In the depicted embodiment, the first virtual ECU 269 is operable to provide ADAS functionality (as indicated by the ADAS software 299) and the second virtual ECU 267 is operable to provide infotainment system functionality (as indicated by the infotainment software 296).

The ADAS software 299 includes code and routines that are operable, when executed by the processor 125, to provide ADAS functionality and to generate one or more I/O requests which help to provide this ADAS functionality. These I/O requests are addressed to one or more of the following: one or more sensors of the sensor set 182; and one or more actuators of the actuator set 184. The first OS 297 includes a first operating system which is compatible with the ADAS software 299 and the provision of the ADAS functionality provided by the ADAS software 299.

The infotainment software 296 includes code and routines that are operable, when executed by the processor 125, to provide infotainment functionality and to generate one or more I/O requests which help to provide this infotainment functionality. These I/O requests are addressed to one or more of the following: one or more sensors of the sensor set 182; and one or more actuators of the actuator set 184. The second OS 294 includes a second operating system which is compatible with the infotainment software 296 and the provision of the infotainment functionality provided by the infotainment software 296. The second OS 294 may be different than the first OS 297 such that the first OS 297 and the second OS 294 form a heterogenous pair of OSes.

The OS hypervisor 259 includes a hypervisor I/O queue for managing the I/O requests generated by the ADAS software 299 and the infotainment software 296. The hypervisor I/O queue includes an I/O queue for temporarily storing I/O requests. An I/O communication conflict occurs if the ADAS software 299 and the infotainment software 296 each address I/O requests to the same I/O device at the same time or substantially the same time such that bottlenecking would occur but for the latency system 199 providing its functionality.

Referring now to FIG. 2C, depicted is an example of the rule data 287 according to some embodiments.

As depicted in FIG. 2C, the rule data 287 is organized as a table. Accordingly, this table may be referred to herein as a "rule table." However, other data structures are possible. The rule table depicted in FIG. 2C includes four columns storing the following types of classes of digital data: "vehicle feature"; "related sensor from sensor set"; "criteria relevant to the vehicle feature"; and "thresholds for triggering the provision of the vehicle feature". The digital data of these four columns is described in more detail below.

A first column storing "vehicle feature" includes digital data describing different vehicle features installed in the ego vehicle. The ego vehicle includes, for example, the vehicle 123 which includes the computer system 200. The different vehicle features stored in this column include, for example, a plurality of different ADAS systems and a plurality of different infotainment systems.

A second column storing "related sensor from sensor set" includes digital data describing different sensors used by the different "vehicle features listed in the first column of the rule table. These are examples of the different I/O devices that might be called by the ADAS system or infotainment system described in the first column.

For example, the ADAS feature provided by the PCS uses one or more of the following vehicle sensors included in the sensor set 182 of the vehicle 123: one or more cameras; one or more millimeter wave radars; and one or more speed sensors. Accordingly, when the PCS is active, the PCS software which provides the ADAS feature of the PCS generates and transmits one or more I/O requests one or more of the following vehicle sensors included in the sensor set 182 of the vehicle 123: one or more cameras; one or more millimeter wave radars; and one or more speed sensors. In this way, the second column describes which I/O devices are called when the vehicle feature described by the first column is active.

In this way, the I/O control module 206 is able to access the rule data 287 and determine, based on the vehicle features which are currently active, what I/O devices are being called and, based on commonality among these I/O devices, whether an I/O communication conflict is present or likely to be present in the near future.

For example, assume the I/O control module 206 determines, based on the feature data 283, that the PCS and the ACC systems are both active at the same time or substantially the same time. The I/O control module 206 analyzes the rule table and determines, based on the second column of the rule table for the PCS and the ACC systems, that the vehicle features provided by the PCS and ACC systems have an overlapping dependency of vehicle sensors because each of these ADAS systems each call the same sensors. In this situation, the I/O control module 206 may prevent or reduce latency for the PCS and the ACC systems by imposing virtual I/O for the I/O requests generated by the PCS and the ACC systems. However, note that the PCS system provides a vehicle feature that is more relevant to safety than the ACC system since, for example, the PCS system prevents collisions whereas the ACC system provides a convenience, and so, if the situation data 289 indicates that a collision may be imminent, then the I/O control module 206 will grant the PCS system direct I/O will imposing virtual I/O on the ACC system, thereby ensuring that I/O requests for the PCS system are processed as quick as possible while the I/O requests for the ACC system are delayed for a period of time until the PCS system takes actions which remove the risk of a collision.

A third column storing "criteria relevant to the vehicle feature" includes digital data describing different measurable criteria relevant to the vehicle feature listed in the first column of the rule table. For example, the third column describes one or more of the following: criteria which, when met or exceeded, result in triggering an ADAS system to take action by providing its ADAS functionality; and criteria required for an infotainment system to provide its functionality.

For example, the ACC system is triggered and provides its ACC functionality if one or more of the following are true based on the sensor data 295 or the situation data 289: (1) the range separating the ego vehicle and another object on the roadway, towards which the ego vehicle is heading on a collision course, is substantially 50 meters or less (or some other number or threshold); and (2) the relative speed between the ego vehicle and this object is 50 miles per hour or more (or some other number or threshold).

A fourth column storing "thresholds for triggering the provision of the vehicle feature" includes digital data describing different thresholds associated with the criteria of the third column which must be met or exceeded before the vehicle feature listed in the first column of the rule table provides its functionality. For example, the fourth column describes one or more thresholds that are relevant to the triggering of the ADAS feature/ADAS system or one or more thresholds relevant to providing an infotainment feature.

In some embodiments, the monitor module 204 determines which vehicle features are implemented by the current driving situation described by the situation data 289 based on analysis of the rule data 287 and the situation data 289. The monitor module 204 generates feature data 283 that describes the vehicle features that are implemented responsive to the current driving situation described by the situation data 289. The monitor module 204 stores this feature data 283 in the memory 127 of the ECU that is accessible by both the monitor module 204 and the I/O control module 206. The I/O control module 206 retrieves the feature data 283 from the memory 127 and determines how to manage the I/O requests associated with the vehicle feature described by the feature data 283 based on (1) the relative urgency of the vehicle features described by the feature data 283 and (2) the presence of one or more I/O communication conflicts. The I/O control module 206 determines which vehicle features are installed in the ego vehicle and the urgency of these vehicle features based on the situation described by the situation data 289.

In some embodiments, the urgency of a vehicle feature relates to whether the vehicle feature is associated with something more important, such as passenger safety, or something less important, such as passenger entertainment or driver convenience. The relative importance of different vehicle features varies based on the situation described by the situation data 289.

Assume a first situation described by the situation data 289 in which an ego vehicle is approaching a second vehicle at range and relative speed that indicate that the ego vehicle is on a collision course with the second vehicle. Further assume that the ego vehicle has the following vehicle features available to it: a PCS system; an ACC system; a LKA system; and an infotainment system. In this first situation, the PCS system is most urgent, followed by the ACC system, followed by the LKA system and then finally the infotainment system.

Assume a second situation described by the situation data 289 in which an ego vehicle is departing its lane of travel by greater than 20% (e.g., more than 20% of the ego vehicle is over the line that separates the ego vehicle's lane of travel from a neighboring lane). Further assume that the ego vehicle has the following vehicle features available to it: a PCS system; an ACC system; a LKA system; and an infotainment system. In this first situation, the LKA system is most urgent, followed by the ACC system, followed by the PCS system and then finally the infotainment system.

Accordingly, the urgency value assigned to different vehicle features is variable based on the situation described by the situation data 289 and the relationship of the vehicle features to the situation and also whether the vehicle feature is related to safety or entertainment or convenience.

In some embodiments, the presence of one or more I/O communication conflicts is identified by the I/O control module 206 based on the other vehicle features that are currently active at the same time as the particular vehicle feature described by the feature data 283 and a commonality of the sensors, actuators and/or other devices that are contemporaneously used by these other vehicle features and the particular vehicle feature described by the feature data 283.

Figure 3A:
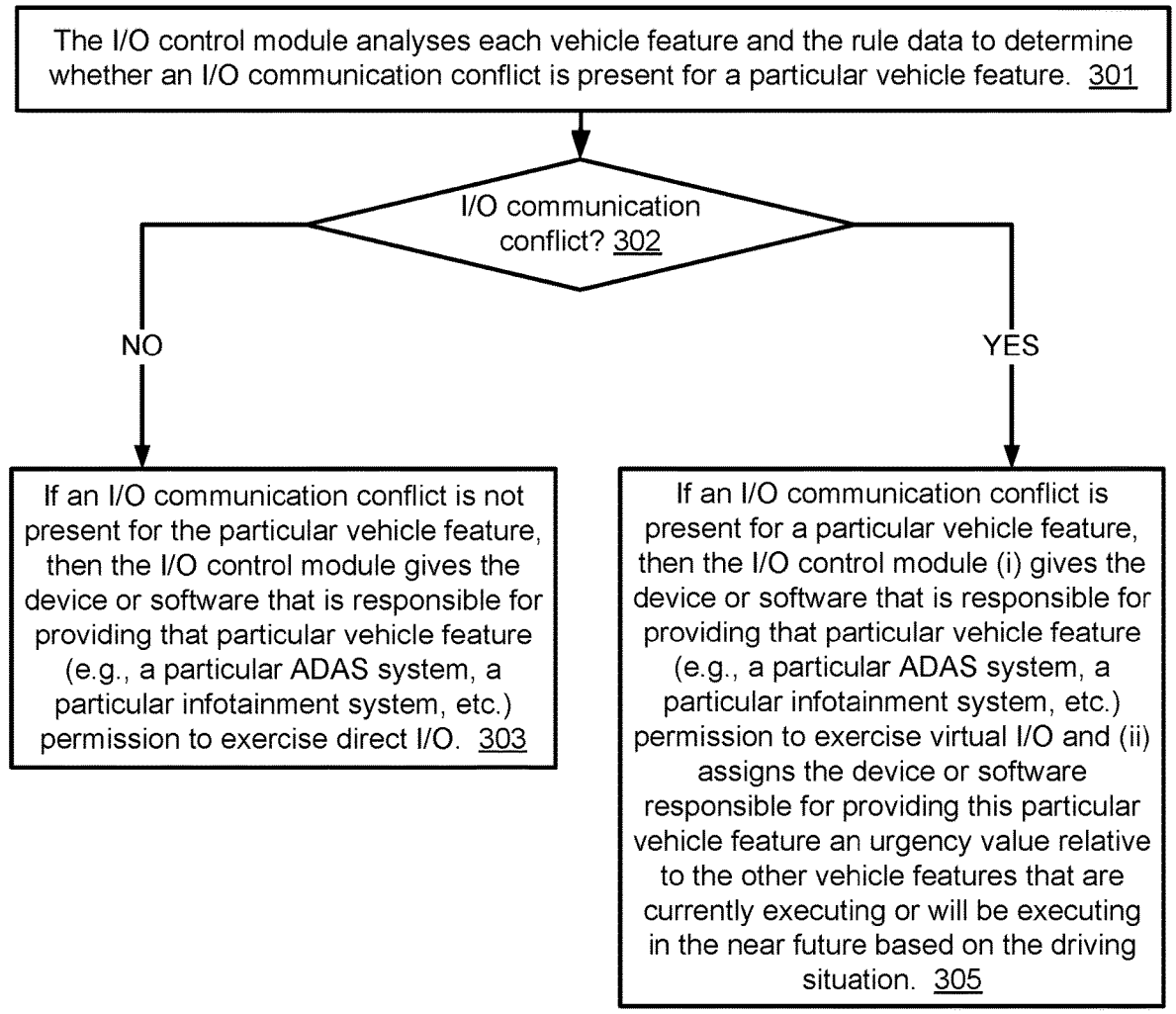
FIG. 3A is a flowchart of an example method for managing one or more I/O requests for an ego vehicle according to some embodiments.

Referring now to FIG. 3A, depicted is a flowchart of an example method 300 for managing one or more I/O requests for an ego vehicle according to some embodiments.

In some embodiments, one or more of the steps described herein for the method 300 may be executed by the latency system.

At step 301, the I/O control module analyses each vehicle feature described by the feature data as well as the rule data to determine whether an I/O communication conflict is present for a particular vehicle feature which is described by the feature data relative to other vehicle features that are described by the feature data.

At step 302, a determination is made regarding whether an I/O communication conflict is present. If an I/O communication conflict is not present, then the method 300 proceeds to step 303. If an I/O communication conflict is present, then the method 300 proceeds to step 305.

At step 303, if an I/O communication conflict is not present for the particular vehicle feature, then the I/O control module gives the device or software that is responsible for providing that particular vehicle feature (e.g., a particular ADAS system, a particular infotainment system, etc.) permission to exercise direct I/O.

For example, with reference to FIG. 2C, assume that the particular vehicle feature is the PCS system (requiring the camera, the millimeter wave radar and the speed sensor) and the movie streaming feature is also operating (requiring the communication unit). The I/O control module will determine that these two vehicle features do not have an I/O communication conflict because the example rule table shown in FIG. 2C indicates that they do not share an overlap in the second column. Because of this, the I/O control module will grant direct I/O permission to the PCS system. As a result, the PCS system can directly transmit I/O requests to the camera sensor and the brake controller without these I/O requests being queued in the hypervisor I/O queue.

Referring back to FIG. 3A. At step 305, if an I/O communication conflict is present for the particular vehicle feature, then the I/O control module (i) gives the device or software that is responsible for providing that particular vehicle feature (e.g., a particular ADAS system, a particular infotainment system, etc.) permission to exercise virtual I/O and (ii) assigns the device or software responsible for providing this particular vehicle feature an urgency value relative to the other vehicle features that are currently executing or will be executing in the near future based on the driving situation described by the situation data.

For example, with reference to FIG. 2C, assume that the particular vehicle feature is the PCS system (requiring the camera, millimeter wave radar and the speed sensor) and that the LKA system is operating at the same time (requiring the camera, millimeter wave radar, the speed sensor and the steering angle sensor). Since both of these vehicle features share a commonality of sensors, the I/O control module grants each permission to exercise virtual I/O.

Figure 3B:
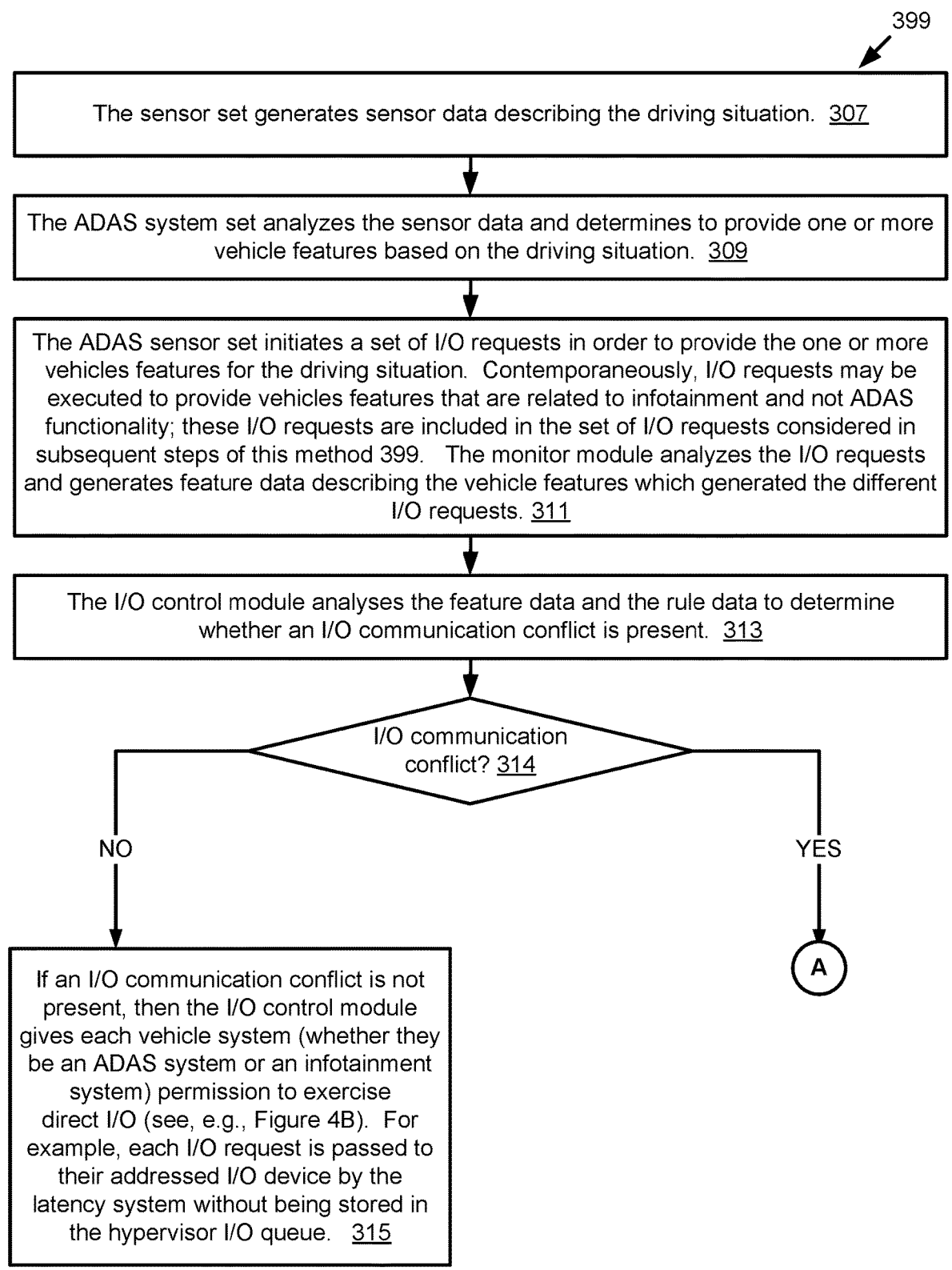
FIGS. 3B and 3C are a flowchart of an example method for managing one or more I/O requests for a set of ADAS systems and one or more infotainment systems of an ego vehicle according to some embodiments.
Figure 3C:
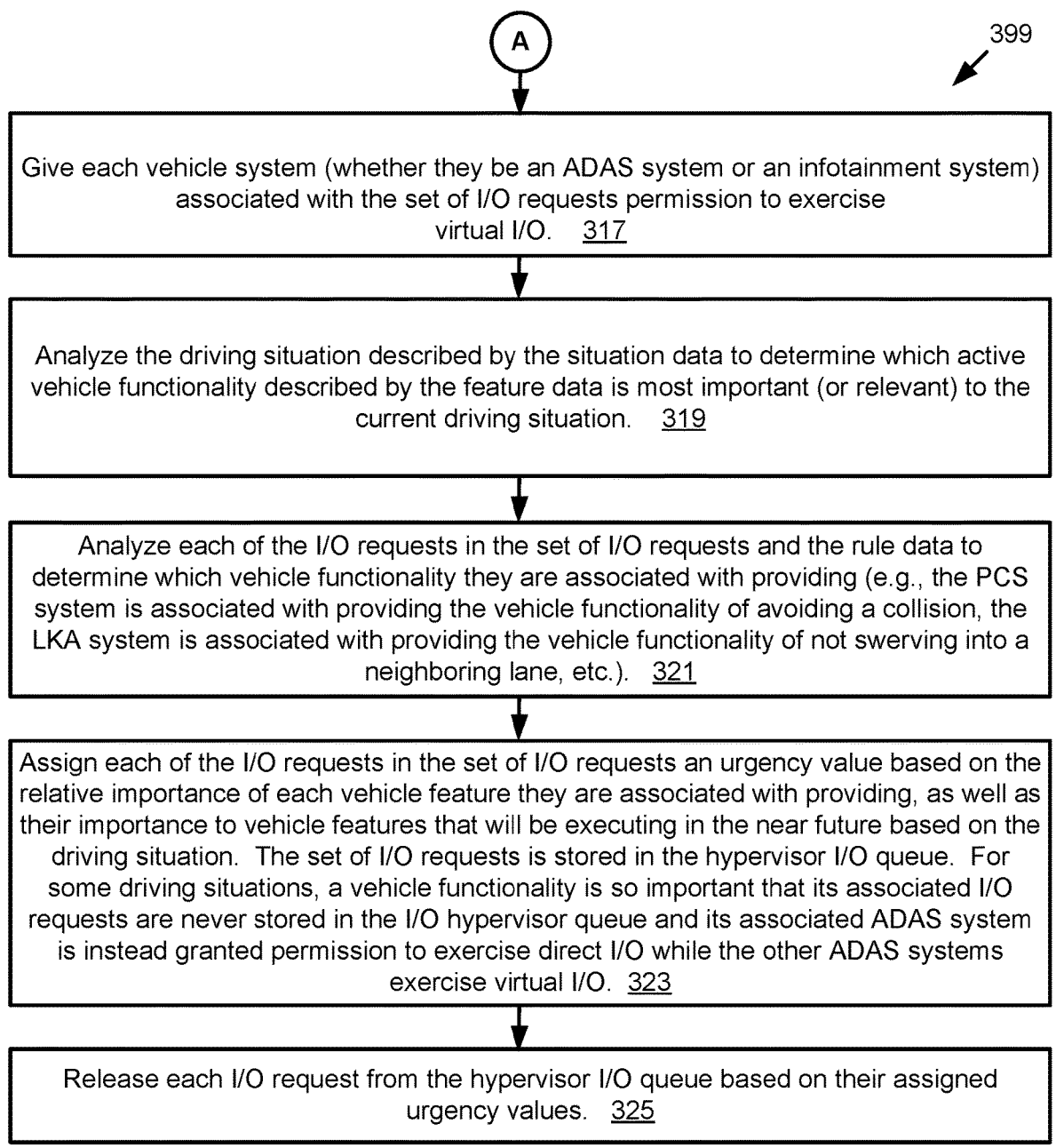

Referring now to FIGS. 3B and 3C, depicted is a flowchart of an example method 399 for managing one or more I/O requests for a set of ADAS systems and one or more infotainment systems of an ego vehicle according to some embodiments.

In some embodiments, one or more of the steps described herein for the method 399 may be executed by the latency system.

At step 307, the sensor set generates sensor data describing the driving situation for the ego vehicle.

At step 309, the ADAS system set analyzes the sensor data and determines to provide one or more vehicle features based on the driving situation.

At step 311, the ADAS sensor set initiates a set of I/O requests in order to provide the one or more vehicles features for the driving situation. Contemporaneously, I/O requests may be executed to provide vehicles features that are related to infotainment and not ADAS functionality; these I/O requests are included in the set of I/O requests considered in subsequent steps of this method 399.

The monitor module analyzes the I/O requests and generates feature data describing the vehicle features which generated the different I/O requests.

At step 313, analyses the feature data and the rule data to determine whether an I/O communication conflict is present.

At step 314, a determination is made regarding whether an I/O communication conflict is present. If no I/O communication conflict is present, then the method 399 proceeds to step 315. If an I/O communication conflict is present at step 314, then the method 399 proceeds to step 317 depicted on FIG. 3C.

Figure 4B:
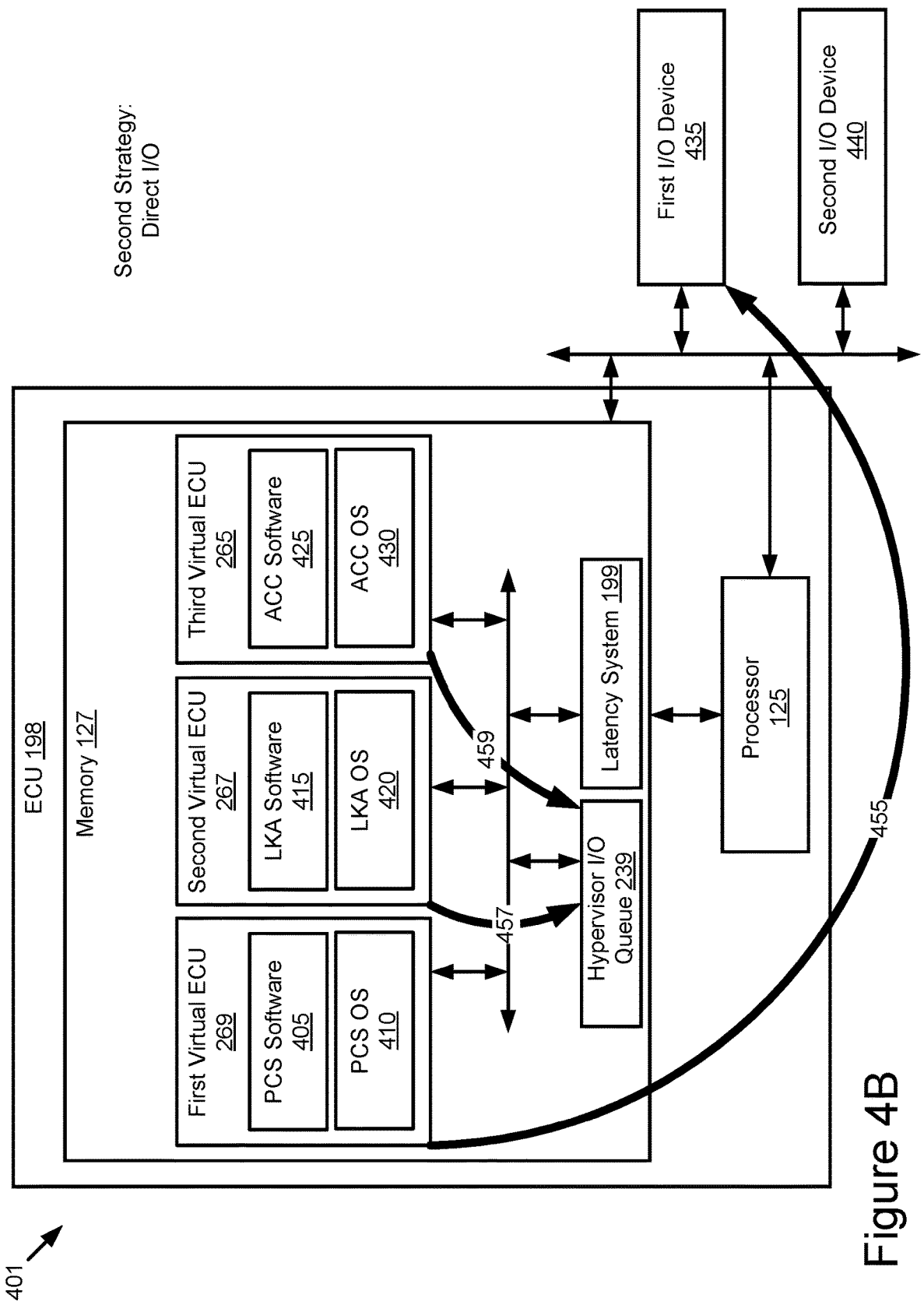
FIG. 4B is a block diagram of an example direct I/O strategy implemented by the latency system according to some embodiments.

At step 315, the I/O control module gives each vehicle system (whether they be an ADAS system or an infotainment system) permission to exercise direct I/O (see, e.g., FIG. 4B). For example, each I/O request is passed to their addressed I/O device by the latency system without being stored in the hypervisor I/O queue.

Referring now to FIG. 3C. At step 317, each vehicle system (whether they be an ADAS system or an infotainment system) associated with the set of I/O requests is given permission to exercise virtual I/O (see, e.g., FIG. 4A).

At step 319, the driving situation described by the situation data is analyzed to determine which active vehicle functionality described by the feature data is most important (or relevant) to the current driving situation. In some embodiments, any vehicle functionality provided by an infotainment system is always less relevant to the driving situation than vehicle functionality provided by an ADAS system since infotainment is less important than safety.

At step 321, each of the I/O requests in the set of I/O requests and the rule data is analyzed to determine which vehicle functionality they are associated with providing (e.g., the PCS system is associated with providing the vehicle functionality of avoiding a collision, the LKA system is associated with providing the vehicle functionality of not swerving into a neighboring lane, etc.).

At step 323, each of the I/O requests in the set of I/O requests is assigned an urgency value based on the relative importance of each vehicle feature they are associated with providing, as well as their importance to vehicle features that will be executing in the near future based on the driving situation described by the situation data. The set of I/O requests is stored in the hypervisor I/O queue. For some driving situations, a vehicle functionality is so important that its associated I/O requests are never stored in the I/O hypervisor queue and its associated ADAS system is instead granted permission to exercise direct I/O while the other ADAS systems exercise virtual I/O.

At step 325, each I/O request is released from the hypervisor I/O queue based on their assigned urgency values.

Referring now to FIG. 4A, depicted is a block diagram of an example virtual I/O strategy 400 implemented by the latency system according to some embodiments.

The ECU 198 executes three different virtual ECUs: the first ECU 269; the second virtual ECU 267; and the third virtual ECU 265.

The first virtual ECU 269 provides the ADAS functionality of a PCS system. The first virtual ECU 269 includes PCS software 405 and a PCS OS 410. The PCS software 405 includes code and routines which, when executed by the processor 125, provide the ADAS functionality of the PCS system. Providing the ADAS functionality of a PCS system includes transmitting one or more I/O requests 455 to one or more of the first I/O device 435 and the second I/O device 440. The PCS OS 410 is an operating system for compatible with the PCS software 405.

The second virtual ECU 267 provides the ADAS functionality of a LKA system. The second virtual ECU 267 includes LKA software 415 and a LKA OS 420. The LKA software 415 includes code and routines which, when executed by the processor 125, provide the ADAS functionality of the LKA system. Providing the ADAS functionality of a LKA system includes transmitting one or more I/O requests 457 to one or more of the first I/O device 435 and the second I/O device 440. The LKA OS 420 is an operating system for compatible with the LKA software 415.

The third virtual ECU 265 provides the ADAS functionality of an ACC system. The third virtual ECU 265 includes ACC software 425 and a ACC OS 430. The ACC software 425 includes code and routines which, when executed by the processor 125, provide the ADAS functionality of the ACC system. Providing the ADAS functionality of a ACC system includes transmitting one or more I/O requests 459 to one or more of the first I/O device 435 and the second I/O device 440. The ACC OS 430 is an operating system for compatible with the ACC software 425.

Note that in FIG. 4A, the I/O requests 455, 457, 459 are each routed to the hypervisor I/O queue 239.

Referring now to FIG. 4B, depicted is a block diagram of an example direct I/O strategy 401 implemented by the latency system according to some embodiments.

FIG. 4B includes elements that are similar to those described above for FIG. 4A, and so, those descriptions will not be repeated here.

Note that in FIG. 4A, the I/O requests 457, 459 are each routed to the hypervisor I/O queue 239 while some I/O requests 455 are routed directly to an I/O device without being routed through the hypervisor I/O queue 239.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method executed by a processor of a vehicle for improving a performance of a set of Advanced Driver Assistance Systems ("ADAS systems") included in the vehicle by decreasing a latency for processing a set of input/output ("I/O") requests generated by one or more active ADAS systems from the set of ADAS systems, the method comprising:
   determining situation data describing a driving situation for the vehicle;
   determining that an I/O communication conflict exists between a first I/O request and a second I/O request for the one or more active ADAS systems that handle the driving situation;
   responsive to the I/O communication conflict existing, determining to apply a virtual I/O strategy to the first I/O request and the second I/O request;
   routing the first I/O request and the second I/O request request through a hypervisor I/O queue;
   assigning urgency values for the first I/O request and the second I/O request, respectively, based on whether vehicle features for the first I/O request and the second I/O request are associated with safety; and
   processing the first I/O request and the second I/O request out of a hypervisor I/O queue based on the urgency values.

2. The method of claim 1, further comprising receiving sensor data from an external sensor that describes a roadway environment outside the vehicle, wherein the sensor data is used to determine the situation data.

3. The method of claim 1, wherein the set of ADAS systems are provided by a single hardware Electronic Control Unit ("ECU" if singular, "ECUs" if plural) that executes an Operating System ("OS" if singular, "OSes" if plural) hypervisor which, when executed by the processor, generates a plurality of virtual ECUs which each provide a different ADAS system from the set of ADAS systems.

4. The method of claim 3, wherein each virtual ECU from the plurality of ECUs includes a different OS such that the plurality of ECUs include heterogeneous OSes.

5. The method of claim 3, the method further comprising:
   assigning an urgency value to each of the one or more active ADAS systems based on a relative urgency of the one or more active ADAS systems based on the driving situation, wherein the first I/O request and the second I/O request are each assigned the urgency value which was assigned to the one or more active ADAS systems which generated each individual I/O request; and
   storing the first I/O request and the second I/O request in the hypervisor I/O queue;
   wherein the vehicle features for the first I/O request and the second I/O request being associated with the safety is the safety of driving situation.

6. The method of claim 1, wherein the vehicle is an autonomous vehicle.

7. The method of claim 1, wherein the vehicle is a Highly Autonomous Vehicle ("HAV").

8. A system for improving a performance of a set of Advanced Driver Assistance Systems ("ADAS systems") included in a vehicle by decreasing a latency for processing a set of input/output ("I/O") requests generated by one or more active ADAS systems from the set of ADAS systems, the system comprising:
a processor; and
a non-transitory memory storing computer code which is operable, when executed by the processor, to cause the processor to perform steps comprising:
determining situation data describing a driving situation for the vehicle;
determining that an I/O communication conflict exists between a first I/O request and a second I/O request for the one or more active ADAS systems that handle the driving situation; and
responsive to the I/O communication conflict existing, determining to apply a virtual I/O strategy to the first I/O request and the second I/O request of;
routing the first I/O request and the second I/O request through a hypervisor I/O queue;
assigning urgency values for the first I/O request and the second I/O request, respectively, based on whether vehicle features for the first I/O request and the second I/O request are associated with safety; and
processing the first I/O request and the second I/O request out of a hypervisor I/O queue based on the urgency values.

9. The system of claim 8, wherein the processor is further operable to perform a step comprising receiving sensor data that describes a roadway environment outside the vehicle, global positioning data, and map data and wherein the sensor data is used to determine the situation data.

10. The system of claim 8, wherein the set of ADAS systems are provided by a single hardware Electronic Control Unit ("ECU" if singular, "ECUs" if plural) that executes an Operating System ("OS" if singular, "OSes" if plural) hypervisor which, when executed by the processor, generates a plurality of virtual ECUs which each provide a different ADAS system from the set of ADAS systems.

11. The system of claim 10, wherein each virtual ECU from the plurality of ECUs includes a different OS such that the plurality of ECUs include heterogeneous OSes.

12. The system of claim 8, wherein the vehicle is an autonomous vehicle.

13. The system of claim 8, wherein the vehicle is a Highly Autonomous Vehicle ("HAV").

14. A computer program product for decreasing a latency for processing a set of input/output ("I/O") requests generated by one or more active Advanced Driver Assistance Systems ("ADAS systems") from a set of ADAS systems of a vehicle, the computer program product comprising a non-transitory memory storing computer-executable code that, when executed by a processor, causes the processor to:
determine situation data describing a driving situation for the vehicle;
determine that an I/O communication conflict exists between a first I/O request and a second I/O request for the one or more active ADAS systems that handle the driving situation;
responsive to the I/O communication conflict existing, determine to apply a virtual I/O strategy to the first I/O request and the second I/O request;
route the first I/O request and the second I/O request through a hypervisor I/O queue;
assign urgency values for the first I/O request and the second I/O request, respectively, based on whether vehicle features for the first I/O request and the second I/O request are associated with safety; and
process the first I/O request and the second I/O request out of a hypervisor I/O queue based on the urgency values.

15. The computer program product of claim 14, wherein the computer-executable code, when executed by a processor, further causes the processor to receive sensor data that describes a roadway environment outside the vehicle, global positioning data, and map data and wherein the sensor data is used to determine the situation data.

16. The computer program product of claim 14, wherein the set of ADAS systems are provided by a single hardware Electronic Control Unit ("ECU" if singular, "ECUs" if plural) that executes an Operating System ("OS" if singular, "OSes" if plural) hypervisor which, when executed by the processor, generates a plurality of virtual ECUs which each provide a different ADAS system from the set of ADAS systems.

17. The computer program product of claim 16, wherein each virtual ECU from the plurality of ECUs includes a different OS such that the plurality of ECUs include heterogeneous OSes.

18. The computer program product of claim 14, wherein the vehicle is a Highly Autonomous Vehicle ("HAV").

19. The computer program product of claim 14, wherein the computer-executable code, when executed by a processor, further causes the processor to:
determine that a subsequent IO communication conflict does not exist; and
transmit a set of I/O requests directly to one or more I/O devices which are addressed by the set of I/O requests.

20. The computer program product of claim 14, wherein the virtual I/O strategy includes queuing first I/O request and the second I/O request in the hypervisor I/O queue of an OS hypervisor responsible for providing the set of ADAS systems via a set of virtual ECUs generated by the OS hypervisor upon being executed by the processor.

* * * * *